(12) United States Patent
Hamada et al.

(10) Patent No.: US 10,397,260 B2
(45) Date of Patent: Aug. 27, 2019

(54) NETWORK SYSTEM

(71) Applicants: NIPPON TELEGRAPH AND TELEPHONE CORPORATION, Tokyo (JP); PREFERRED NETWORKS, INC., Tokyo (JP)

(72) Inventors: Takahiro Hamada, Tokyo (JP); Yuminobu Igarashi, Tokyo (JP); Shohei Hido, San Mateo, CA (US)

(73) Assignees: NIPPON TELEGRAPH AND TELEPHONE CORPORATION, Tokyo (JP); Preferred Networks, Inc., Tokyo (JP)

( * ) Notice: Subject to any disclaimer, the term of this patent is extended or adjusted under 35 U.S.C. 154(b) by 0 days.

(21) Appl. No.: 15/498,138

(22) Filed: Apr. 26, 2017

(65) Prior Publication Data

US 2017/0230396 A1 Aug. 10, 2017

Related U.S. Application Data

(62) Division of application No. 15/319,192, filed as application No. PCT/JP2015/067519 on Jun. 17, 2015.

(30) Foreign Application Priority Data

Jun. 18, 2014 (JP) .................................. 2014-125403

(51) Int. Cl.
*H04L 29/06* (2006.01)
*H04L 12/66* (2006.01)
(Continued)

(52) U.S. Cl.
CPC .......... *H04L 63/1425* (2013.01); *H04L 12/66* (2013.01); *H04L 63/0209* (2013.01);
(Continued)

(58) Field of Classification Search
CPC .................................................. H04L 63/1425
(Continued)

(56) References Cited

U.S. PATENT DOCUMENTS 9,600,676 B1 *  3/2017  Farmer .................. G06F 21/62
2005/0220076 A1 * 10/2005  Kokado .............. H04L 12/2854
                                              370/351
(Continued)

FOREIGN PATENT DOCUMENTS

CN      1878141 A    12/2006
JP      2005-5927 A   1/2005
(Continued)

OTHER PUBLICATIONS

Azni, "Analysis of Packets Abnormalities in Wireless Sensor Network", 2009 Fifth International Conference on MEMS NANO, and Smart Systems pp. 259-264 (Year: 2009).*
(Continued)

*Primary Examiner* — Khalil Naghdali
(74) *Attorney, Agent, or Firm* — Oblon, McClelland, Maier & Neustadt, L.L.P.

(57) ABSTRACT

A control apparatus performs analysis by using partial information and determines whether or not communication is abnormal. If the communication is determined to be abnormal, the control apparatus controls a communication route for a communication control device such that the communication is transmitted from a communication apparatus to the control apparatus. Further, the control apparatus determines whether or not the communication transmitted by the control of the communication route is malicious communication. As a result, if the communication is determined to be malicious communication, the control apparatus controls the communication control device to restrict the malicious communication.

20 Claims, 26 Drawing Sheets

(51) Int. Cl.
*H04L 29/08* (2006.01)
*H04L 12/715* (2013.01)

(52) U.S. Cl.
CPC ........ *H04L 63/029* (2013.01); *H04L 63/1416* (2013.01); *H04L 63/1441* (2013.01); *H04L 45/64* (2013.01); *H04L 67/10* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 2007/0061487 A1* | 3/2007 | Moore | .............. | G06F 17/30575 709/246 |
| 2007/0204060 A1 | 8/2007 | Higuchi et al. | | |
| 2011/0261710 A1 | 10/2011 | Chen | | |
| 2018/0026999 A1* | 1/2018 | Ruvio | ..................... | H04L 63/02 726/23 |

FOREIGN PATENT DOCUMENTS

| | | | |
|---|---|---|---|
| JP | 2007-243459 A | 9/2007 | |
| JP | 2009-117929 A | 5/2009 | |
| JP | 2011-130238 A | 6/2011 | |
| JP | 2013-192128 A | 9/2013 | |
| JP | 2014155153 A * | 8/2014 | ............ H04W 12/02 |

OTHER PUBLICATIONS

T. Hamada, et al., "A Consideration of Network Security for Virtualization of Home Network System," Proceedings of the 2014 IEICE General Conference Tsushin 2, Mar. 2014, 8 pages (with partial English translation).

Y. Komiya, et al., "A study of security SaaS on Cloud Computing," IPSJ SIG Notes Computer Security (CSEC), No. 49, Jun. 2010, 16 pages (with partial English translation).

International Search Report dated Sep. 1, 2015 in PCT/JP2015/067519 filed Jun. 17, 2015.

Extended European Search Report dated Feb. 27, 2018 in Patent Application No. 15809108.2, 5 pages.

Decision to Grant a Patent dated Jun. 12, 2018 in Japanese Patent Application no. 2017-103072 (with unedited computer generated English translation), 5 pages.

Office Action dated Sep. 25, 2018 in Japanese Patent Application No. 2017-203905, 5 pages (with unedited computer generated English translation).

Office Action dated Aug. 9, 2018 in co-pending U.S. Appl. No. 15/319,192.

Office Action dated Feb. 3, 2019 in Chinese Application No. 201580031941.4 (w/partial English translation).

* cited by examiner

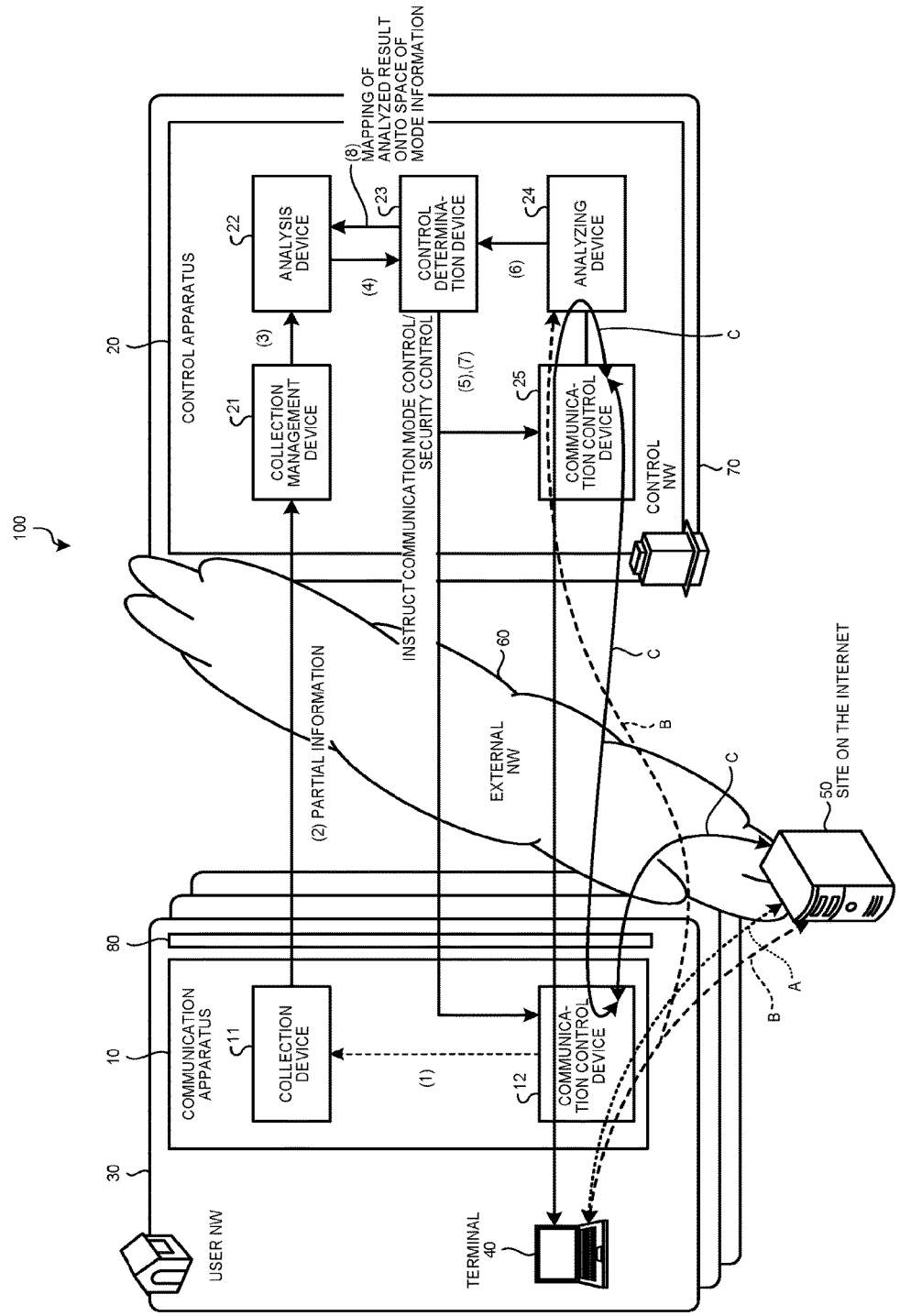

FIG.12

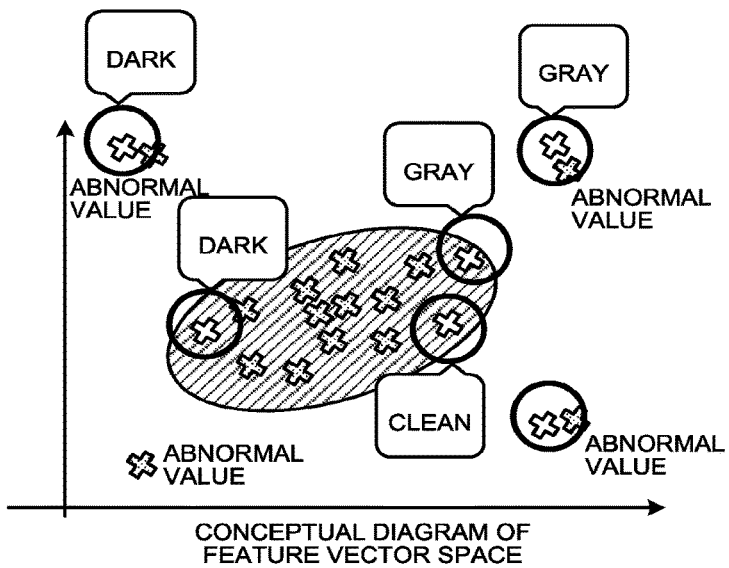

✥ : FEATURE VECTOR OF ABNORMALITY DETECTION BY ANALYSIS DEVICE IN NORMAL MODE
(MODEL INFORMATION OF FIRST EMBODIMENT)

✥ : FEATURE VECTOR CORRESPONDING TO RESULT OF DETERMINATION BY ANALYZING DEVICE

⬜ : RESULT OF DETERMINATION BY ANALYZING DEVICE (LABEL)

◯ : FEATURE VECTOR CORRESPONDING TO THIS REGION IS CONTROLLED ACCORDING TO DETERMINATION CRITERION BASED ON LABEL
REGION TO WHICH LABEL IS APPLIED MAY BE SET ARBITRARILY

FIG.13

|  |  | MODEL INFORMATION ||
|  |  | SPATIAL REGION DETERMINED TO BE ABNORMAL | SPATIAL REGION NOT DETERMINED TO BE ABNORMAL |
| --- | --- | --- | --- |
| MAPPING INFORMATION | CLEAN DETERMI- NATION | NORMAL MODE (OR MIRRORING MODE) | NORMAL MODE |
| | GRAY DETERMI- NATION | INLINE MODE (OR MIRRORING MODE) | MIRRORING MODE (OR INLINE MODE) |
| | DARK DETERMI- NATION | SECURITY CONTROL (OR INLINE MODE, OR MIRRORING MODE) | SECURITY CONTROL (OR INLINE MODE, OR MIRRORING MODE) |

FIG.20

SIMILARITY BETWEEN SETS

EACH OF THE FOLLOWING THREE SIMILARITY INDICES ORIGINALLY INDICATES DEGREE OF COINCIDENCE BETWEEN ELEMENTS OF TWO SETS, BUT SINCE THEY HAVE DEFINITIONAL EQUATIONS SIMILAR TO COSINE SIMILARITY, THEY MAY BE USED AS CERTAIN TYPE OF SIMILARITY BETWEEN VECTORS.

- JACCARD COEFFICIENT
  WHAT IS OBTAINED BY DIVIDING THE NUMBER OF COMMON ELEMENTS BETWEEN SET X AND SET Y BY THE TOTAL NUMBER OF ELEMENTS THAT ARE IN AT LEAST ONE OF THESE SETS, $$sim = |X \cap Y|/|X \cup Y|$$

IS CALLED JACCARD COEFFICIENT.
  WHEN ELEMENTS OF XY ARE $z_1, z_2, ..., z_n$, AND VECTOR $x = (x_1, x_2, ..., x_n)$ IS DEFINED AS $x_i = 1$ (if $z_i X$), $x_i = 0$ (otherwise), AND VECTOR y IS SIMILARLY DEFINED, JACCARD COEFFICIENT IS EXPRESSED AS FOLLOWS.

$$sim = x \cdot y / (\Sigma x_i + \Sigma y_i - x \ast y)$$

- DICE COEFFICIENT
  WHAT IS OBTAINED BY DIVIDING THE NUMBER OF COMMON ELEMENTS BETWEEN SET X AND SET Y BY AVERAGE OF THE NUMBERS OF ELEMENTS OF THESE SETS, $$sim = 2 \ast |X \cap Y|/(|X|+|Y|)$$

IS CALLED DICE COEFFICIENT.
  BY USING VECTORS x AND y CORRESPONDING TO X AND Y, DICE COEFFICIENT IS EXPRESSED AS FOLLOWS.

$$sim = 2 \ast x \cdot y / (\Sigma x_i + \Sigma y_i)$$

- SIMPSON COEFFICIENT
  WHAT IS OBTAINED BY DIVIDING THE NUMBER OF COMMON ELEMENTS BETWEEN SET X AND SET Y BY THE MINIMUM VALUE OF THE NUMBERS OF ELEMENTS OF THESE SETS, $$sim = |X \cap Y|/\min(|X|,|Y|)$$

IS CALLED SIMPSON COEFFICIENT.
  BY USING VECTORS x AND y CORRESPONDING TO X AND Y, SIMPSON COEFFICIENT IS EXPRESSED AS FOLLOWS.

$$sim = x \cdot y / \min(\Sigma x_i, \Sigma y_i)$$

FIG.24

| ID | 5-TUPLE INFORMATION ||||| CONTENT OF CONTROL |
|---|---|---|---|---|---|---|
| | PROTOCOL NUMBER | TRANSMIS-SION SOURCE IP ADDRESS | DESTINATION IP ADDRESS | TRANSMIS-SION SOURCE PORT NUMBER | DESTINATION PORT NUMBER | |
| 1 | 6(TCP) | A.B.C.D | E.F.G.H | 10000 | 80 | MIRRORING MODE |
| 2 | 6(TCP) | E.F.G.H | A.B.C.D | 80 | 10000 | MIRRORING MODE |
| 3 | 6(TCP) | | I.J.K.L | | 80 | MIRRORING MODE |
| 4 | 17(UDP) | | M.N.O.P | | | INLINE MODE |
| 5 | 6(TCP) | | Q.R.S.T | | 443 | INLINE MODE |
| 6 | 6(TCP) | | U.V.W.X | | | SECURITY CONTROL (PACKET DROP (BLOCKAGE)) |
| ... | | | | | | |

FIG.25

| ID | MATCHING CONDITIONS | | | | | | | | ACTION | COUNTER (STATISTICAL INFORMATION) | | | |
|---|---|---|---|---|---|---|---|---|---|---|---|---|---|
| | PACKET RECEIVING SWITCH PORT NUMBER | TRANSMISSION SOURCE MAC ADDRESS | DESTINATION MAC ADDRESS | PROTOCOL NUMBER | TRANSMISSION SOURCE IP ADDRESS | DESTINATION IP ADDRESS | TRANSMISSION SOURCE PORT NUMBER | DESTINATION PORT NUMBER | ... | | NUMBER OF PACKETS RECEIVED | NUMBER OF BYTES RECEIVED | ELAPSED TIME FROM VALIDATION OF FLOW | ... |
| 1 | | | | | | | | | | | | | |
| 2 | | | | | | | | | | | | | |
| 3 | | | | | | | | | | | | | |
| ... | | | | | | | | | | | | | |

NETWORK SYSTEM

CROSS-REFERENCE TO RELATED APPLICATIONS

The present application is a divisional of and claims the benefit of priority under 35 U.S.C. § 120 from U.S. application Ser. No. 15/319,192, filed Dec. 15, 2016, the entire contents of which is hereby incorporated herein by reference and which is a national stage of International Application No. PCT/JP2015/067519, filed Jun. 17, 2015, which is based upon and claims the benefit of priority under 35 U.S.C. § 119 from Japanese Patent Application No. 2014-125403, filed Jun. 18, 2014.

FIELD

The present invention relates to a network system, a control apparatus, a communication apparatus, a communication control method, and a communication control program.

BACKGROUND

In recent years, methods of attacks via networks have advanced and become difficult to be dealt with by conventional security measures through prior defense. These methods of attacks have been attempted to be dealt with by high performance and high functioning security devices, but when cost of the devices and labor of the operation and management are considered, the devices are difficult to be introduced into general user homes and small-to-medium-sized enterprises. Therefore, advanced security measures are desirably realized by introduction of inexpensive devices, but with such devices, performance and functions are limited.

For example, realization of an advanced security measure by introduction of only inexpensive devices having minimum functions into a user network (NW), such as a home NW or a small-to-medium-sized enterprise NW, and cooperation between these devices and functions outside the user NW, that is, outsourcing of security of the user NW, is hoped for.

For example, conceivable as the security measure is a technique of fully monitoring communication traffic in a user NW with outside functions by causing all of communication traffic (including communication packets and communication flows) between the user NW and an external NW to go through the outside functions arranged in a data center or the like on the Internet or to be subjected to mirroring. Further, for example, there is a technique of sampling traffic in a user NW, transmitting the sampled traffic to outside functions arranged in a data center or the like, and performing abnormality detection.

Further, for example, there is a technique of sending, outside a user NW, communication traffic flowing from the user NW to an intrusion detection system (IDS), determining whether or not the communication traffic is unauthorized communication to a destination application server (AP server), and notifying an administrator of the determination (for example, see Patent Literature 1). Specifically, communication suspected to be unauthorized access to a particular AP server is allocated to a packet transfer device including an IDS in an internet services provider (IPS) in charge of the AP server, and if the communication is determined to be malicious in the packet transfer device, the administrator is notified of the determination. Thereby, the transfer device is able to realize the IDS processing exclusively to the communication to the particular server, rather than to communication to an arbitrary AP server, and thus the processing load is reduced.

CITATION LIST

Patent Literature

Patent Literature 1: Japanese Patent Application Laid-open No. 2009-117929

SUMMARY

Technical Problem

However, the above described conventional techniques have had a problem that user communication is unable to be appropriately protected by detection of malicious communication, without excessive use of the band of the user line or without reduction in accuracy. That is, the above described technique of monitoring all of the communication traffic has had the problem of the band being used excessively. Further, the above described technique of simply sampling the communication traffic without targeting all of the communication traffic and performing abnormality detection has had the problem of reduction in accuracy.

Further, the technique of transferring the communication traffic, which is suspected to be unauthorized access to a particular AP server, to the IDS of the service provider (the ISP, a managed security service provider (MSSP), or the like) that the server belongs to and determining the maliciousness has had the problem that communication in the user network is unable to be protected because the target to be protected is the AP server.

Solution to Problem

A network system, includes: a communication apparatus; and a control apparatus that communicates with the communication apparatus via a network, wherein the communication apparatus includes: a communication control unit that controls communication going through the communication apparatus; and a collection unit that forms partial information that is a part of information related to the communication and transmits the partial information to the control apparatus; the control apparatus includes: an analysis unit that performs analysis by using the partial information received from the communication apparatus and determines whether or not the communication is abnormal; a control determination unit that controls a communication route for the communication control unit such that the communication is transmitted from the communication apparatus to the control apparatus when the communication is determined to be abnormal by the analysis unit; and an analyzing unit that determines whether or not the communication transmitted by the control of the communication route is malicious communication, and the control determination unit further controls, when the communication is determined to be malicious communication by the analyzing unit, the communication control unit to restrict the malicious communication.

Advantageous Effects of Invention

The present invention has an effect of being able to reduce excessive use of a band of a line of a user network and reduction in accuracy related to detection of abnormal or malicious communication, to detect any malicious communication, and to appropriately protect communication in the user network.

BRIEF DESCRIPTION OF DRAWINGS

FIG. 11 is a diagram illustrating a sequential flow of communication control processing by a network system according to a second embodiment.

FIG. 12 is a conceptual diagram of mapping to a feature vector space.

FIG. 13 is a diagram illustrating an example of determination criteria used in abnormality determination processing.

FIG. 20 is a diagram illustrating how to find a similarity between sets.

FIG. 24 is a diagram illustrating an example of information stored in an anomaly information accumulation unit according to the sixth embodiment.

FIG. 25 is a diagram illustrating an example of a flow table that a communication control device according to the sixth embodiment has.

DESCRIPTION OF EMBODIMENTS

Hereinafter, embodiments of a network system, a control apparatus, a communication apparatus, a communication control method, and a communication control program according to the present application will be described in detail, based on the drawings. The network system, the control apparatus, the communication apparatus, the communication control method, and the communication control program according to the present application are not limited by these embodiments.

First Embodiment

In the following embodiment, a configuration of a network system, a configuration of a communication apparatus, a configuration of a control apparatus, a flow of overall processing of the network system, and a flow of processing of each of the communication apparatus and the control apparatus, according to a first embodiment, will be described in order, and lastly, effects according to the first embodiment will be described.

[Configuration of Network System]

Figure 1:
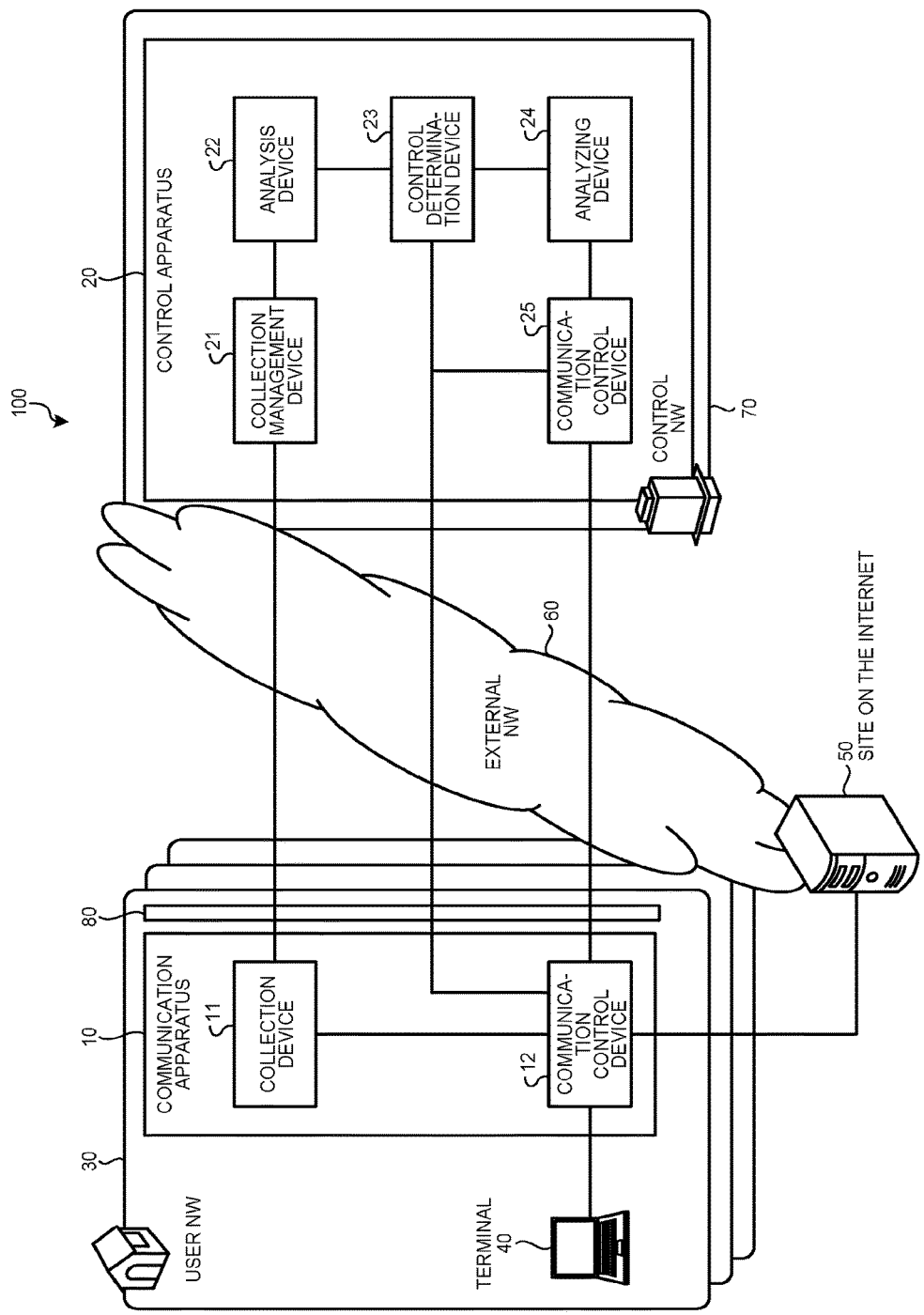
FIG. 1 is a diagram illustrating a configuration of a network system according to a first embodiment.

FIG. 1 is a diagram illustrating the configuration of the network system according to the first embodiment. A network system 100 illustrated in FIG. 1 has a communication apparatus 10 installed in a user NW 30, and a control apparatus 20 installed outside the user NW 30. The communication apparatus 10 and the control apparatus 20 are connected to each other via an external NW 60.

As illustrated in FIG. 1, an installation location of the communication apparatus 10 is at the user NW 30 side. For example, the communication apparatus 10 may be incorporated in a peripheral router, which is at the user NW 30 side and is for performing internet communication, or may be arranged between the peripheral router and a terminal 40, such as a PC, in the user NW 30. In the latter case, the connection is of the inline type (transparent type). That is, communication via the communication apparatus 10 or a part of the communication is a target to be processed. Further, the communication apparatus 10 is formed of a collection device 11 and a communication control device 12.

The collection device 11 collects a part of communication traffic flowing in the user NW 30 and going through the communication apparatus 10, and transmits the collected part as partial information of the communication traffic to a collection management device 21 of the control apparatus 20. The collection device 11 may transmit the collected part of the communication traffic to the collection management device 21 as is; may transmit, as the partial information, only a part of the collected part of the communication traffic; or may transmit, as the partial information of the communication traffic, aggregated or statistically processed information to outside.

The communication control device 12 controls the communication traffic according to a control instruction received from the control apparatus 20. Control processing of the communication traffic includes communication mode control associated with a change of a communication mode and security control (such as packet filtering), which will be described in detail later.

An installation location of the control apparatus 20 is outside the user NW 30 and at a control NW 70 side. For example, the control apparatus 20 is installed in a data center on a communication carrier NW, a NW of an ISP, or the Internet. Further, the control apparatus 20, is formed of five devices, which are the collection management device 21, an analysis device 22, a control determination device 23, an analyzing device 24, and a communication control device 25. The control apparatus 20 may be provided as a single device, and the single device may have respective functions of the collection management device 21, the analysis device 22, the control determination device 23, the analyzing device 24, and the communication control device 25.

The collection management device 21 collects the partial information transmitted from the collection device 11 and transmits the collected partial information to the analysis device 22.

The analysis device 22 performs analysis on the partial information received from the collection management device 21 by, for example, machine learned abnormality detection or the like, and outputs an analysis result thereof to the control determination device 23. Further, the analysis result is stored as model information of machine learning and is applied to analysis thereafter. The analysis is performed by use of a feature vector formed by use of the partial information received as an input and the model information (for example, a feature vector space, a feature space, or the like, which is formed of a feature vector group or formed by aggregation of feature vector groups), and whether or not this feature vector is abnormal is output as the analysis result. Further, by reflecting this feature vector in the model information through machine learning, the model information is updated, and accuracy of analysis thereafter is improved.

The control determination device 23 determines a communication mode based on the analysis result received from the analysis device 22, and instructs each of the communication control devices 12 and 25 to perform communication mode control according to the communication mode. Further, the control determination device 23 determines a communication mode or a content of security control based on an analyzed result received from the analyzing device 24, and instructs each of the communication control devices 12 and 25 to perform communication control according to the determination.

The analyzing device 24 deeply analyzes received communication traffic, determines whether or not the received communication traffic is malicious communication infected with malware or the like, and outputs a result of the determination to the control determination device 23. For example, the analyzing device 24 determines which of "dark" being malicious, "clean" being not malicious, and "gray" being unable to be determined as "clean" or "dark", the received communication traffic is. "Gray" may be multi-staged, and for example, the determination may be made with five levels of "gray", from "5" close to "dark", and "1" close to "clean". A result of the determination includes a protocol number of the communication to be determined, destination and transmission source addresses and port numbers, and the like, and by use of this information, security control is performed in each of the communication control devices 12 and 25.

The communication control device 25 controls the communication traffic according to a control instruction received from the control determination device 23. Examples of control processing of the communication traffic include communication mode control associated with a change of a communication mode, and security control.

In the user NW 30, there are the terminal 40, which is a communication device, such as a PC, and a router (or a terminating device) for communicating with the Internet. The communication apparatus 10 is connected between the terminal 40 and the router 80, and all of communication traffic communicated via the Internet by the terminal 40 is transmitted to and received from the external NW 60 through the router via the communication apparatus 10.

When each of the devices is described with a specific example, for example, the collection device 11 is configured based on an sFlow agent, the collection management device 21 is configured based on an sFlow collector, and each of the communication control devices 12 and 25 is configured based on an OpenFlow (for example, see "https://www.o-pennetworking.org/") compatible switch and a tunneling function of GRE, L2TP, or the like.

Further, for example, the analysis device 22 is a device that is able to perform abnormality detection processing, which is abnormality detection of online machine learning parallel distributed processing framework Jubatus (for example, see *NTT Technical Journal*, 2012.10, pp. 30 to 35, "http://www.ntt.co.jp/journal/1210/files/jn201210030.pdf"). Furthermore, for example, the analyzing device 24 is a device that is able to perform deep packet inspection and identify and deeply analyze application communication from a layer 2 to a layer 7, and detect and block behavior of malicious communication.

Further, when the analyzing device 24 determines that the received communication is malicious communication (dark), the analyzing device 24 outputs a message log corresponding to the determination. Further, when the analyzing device 24 determines the received communication to be suspicious communication (gray), the analyzing device 24 outputs a message log corresponding to the determination, and if there are levels of suspiciousness, the analyzing device 24 also outputs information indicating that level with the message log. Further, if the analyzing device 24 determines that the received communication is not malicious communication (is clean), the analyzing device 24 notifies the outside control determination device 23 or a user of the received communication not being malicious communication, by outputting a message log corresponding to the determination or by not outputting any message log.

The control determination device 23 may determine, based on a result by the analysis device 22 or the analyzing device 24, a content of an instruction, and instruct an OpenFlow compatible switch (for example, an Open vSwitch (http://openvswitch.org/)) via an OpenFlow controller, and may separately instruct construction and deletion of tunneling between the communication control devices 12 and 25.

Further, an OpenFlow controller may be incorporated into each of the communication control devices 12 and 25, the control determination device 23 may transmit a control instruction to each of the OpenFlow controllers, the OpenFlow controllers that have received the instructions may each control writing of a flow entry and the like for the targeted OpenFlow compatible switch.

[Configuration of Communication Apparatus]

Figure 2:
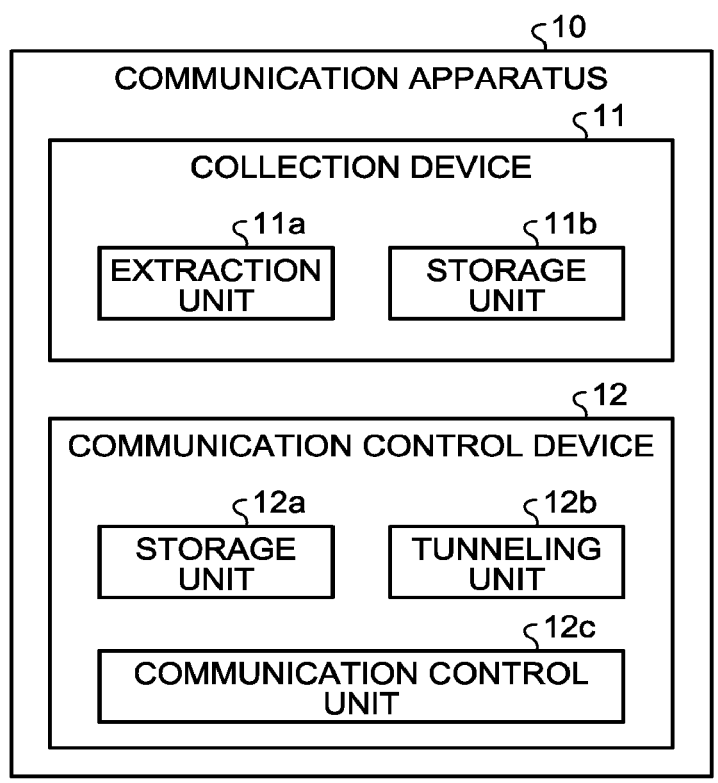
FIG. 2 is a block diagram illustrating a configuration of a communication apparatus according to the first embodiment.

Next, a configuration of the communication apparatus 10 illustrated in FIG. 1 will be described, by use of FIG. 2. FIG. 2 is a block diagram illustrating the configuration of the communication apparatus according to the first embodiment. As illustrated in FIG. 2, the communication apparatus 10 is formed of the collection device 11 and the communication control device 12.

The collection device 11 forms partial information, which is a part of information related to communication, and transmits the partial information to the control apparatus 20. Or, the collection device 11 may collect all of communication collectible in the user network, and form a part of the collected communication as the partial information. The communication in the user network refers to communication going through the communication apparatus 10, for example, communication closed in the user network, or communication between the user network and an external network, such as the Internet. The collection device 11 has an extraction unit 11*a* and a storage unit 11*b*.

The storage unit 11*b* stores therein a collection rule defining rules for collecting the partial information. For example, the storage unit 11*b* stores therein the collection rule including: an extraction rule prescribing a condition for the extraction unit 11*a* to extract communication traffic; and a transmission rule prescribing a condition for transmitting the extracted partial information to the collection management device 21.

The extraction unit 11*a* extracts, based on the collection rule stored in the storage unit 11*b*, the communication traffic, and temporarily stores the extracted communication traffic, as necessary, in the storage unit 11*b*. Further, the extraction unit 11*a* extracts the partial information satisfying a requirement of the extraction rule, and transmits the extracted partial information to the collection management device 21 when a requirement of the transmission rule is satisfied. For example, the extraction unit 11*a* transmits the partial information satisfying the requirement of the collection rule to the collection management device 21, every time the extraction unit 11*a* obtains a predetermined number of packets.

The communication control device 12 has a storage unit 12*a*, a tunneling unit 12*b*, and a communication control unit 12*c*. The storage unit 12*a* stores therein control rules required for communication mode control and security control.

The collection rule for the extraction unit 11*a* will now be described. The collection rule stored in the storage unit 11*b* of the collection device 11 is formed of: information of each element forming a feature vector that becomes an input to the analysis device 22 that performs abnormality detection and the like (for example, time information for each communication direction, duration of a communication session, identification information identifying a user or the user NW 30, a transmission source IP address, a destination IP address, a transmission source port number, a destination port number, application identification information, a data size, a DNS query for name resolution and content information of a response, a time interval and the number of times of these queries, a Time To Live (TTL) of the resolved name, and the like); and information indicating: a calculation method for aggregating or statistically processing these pieces of information in a sampling format or a format similar to sampling; and a moment at which the partial information is transmitted to the collection management device 21 (the moment being the time interval of the collection, the moment being when a predetermined number of packets have been collected, or the like). For example, according to the information indicating the moment, the moment may be a predetermined time interval, or the moment may be when a predetermined number of packets have been collected.

Further, examples of the collection of communication traffic include, for example, data obtainable by SNMP, sFlow, Netflow, or IPFIX, and a sampling method thereof. Or, a scheme for obtaining statistical information that is able to be handled by OpenFlow may be used. In this case, statistical information collected by an OpenFlow compatible switch is transmitted to an OpenFlow controller according to specifications of OpenFlow. For example, if an OpenFlow controller is incorporated in the control determination device 23, the control determination device 23 that has collected statistical information transfers the collected statistical information to the collection management device 21, and if an OpenFlow controller is incorporated in each of the communication control devices (the communication control device 12 and the communication control device 25), statistical information collected on the communication control device 12 is transferred to the collection management device 21 (the transfer may be made via the collection device 11). Further, if a means that is able to identify an application of the layer 7 being used in the communication is incorporated, this identification information may be included in the partial information.

A configuration for aggregating any other information in any format may be incorporated. Necessary element information is able to be extracted by capturing and decomposing a frame or a packet. Further, predetermined communication traffic satisfying a requirement corresponding to the collection rule may be transmitted as is, or a part of this communication traffic may be transmitted. In this case, partial information may be generated at the later described collection management device 21 side, or a feature vector applied to machine learning and the like is generated from received information. For example, if the sFlow technique, which is a sampling based technique, is applied, the feature vector is generated in a collector (corresponding to the collection management device 21), instead of an agent (corresponding to the collection device 11).

The tunneling unit 12*b* constructs a tunnel to the communication control device 25 of the opposite control apparatus 20. The tunneling unit 12*b* constructs the tunnel to a communication control unit 25*c* of the opposite communication control device 25 in order to flow the communication traffic to the analyzing device 24 when the communication mode is a mirroring mode or an inline mode. The communication control unit 12*c* controls communication going through the communication apparatus 10. Specifically, the communication control unit 12*c* performs communication mode control based on the communication mode, and security control, such as packet filtering.

[Configuration of Control Apparatus]

Figure 3:
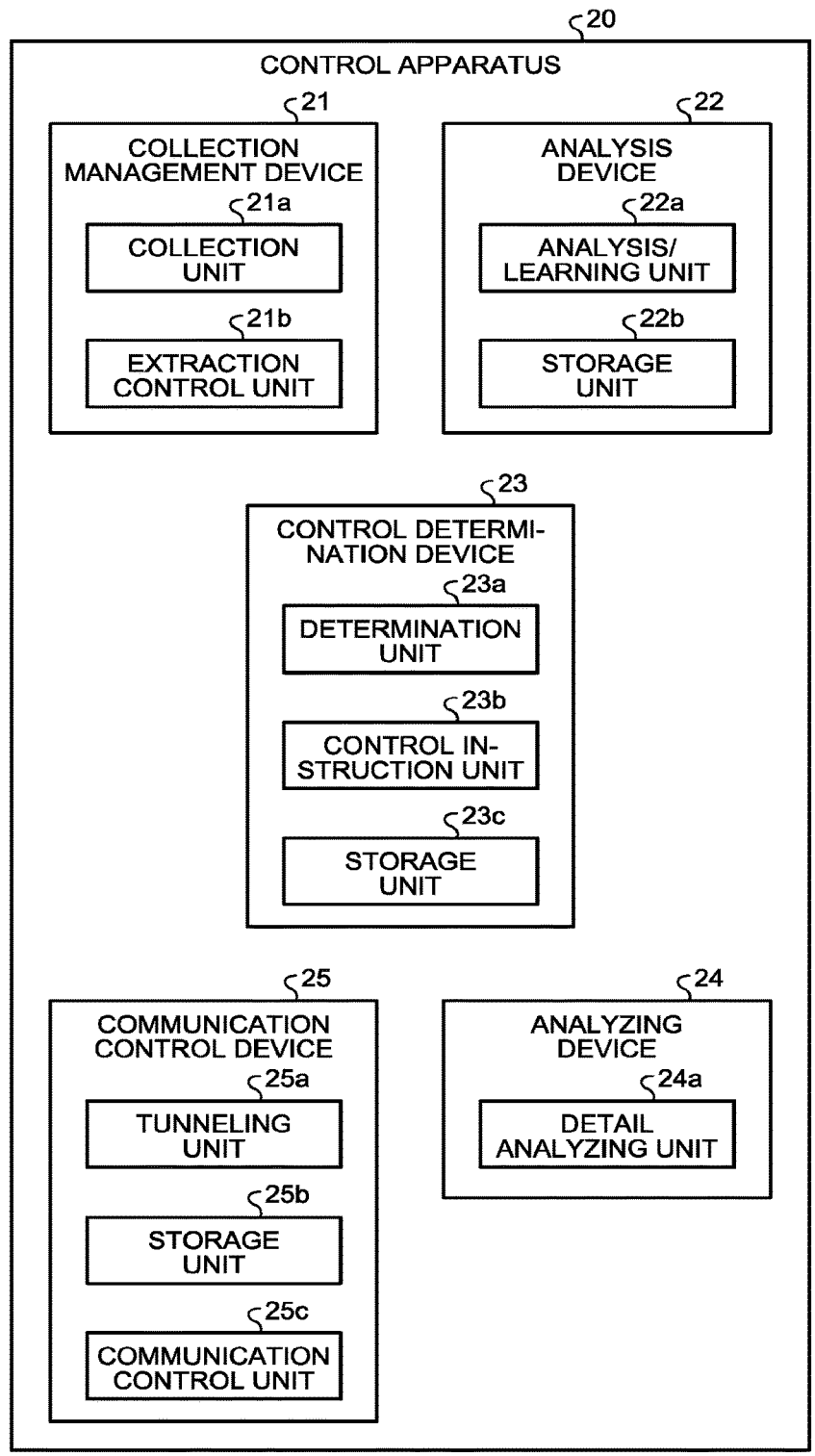
FIG. 3 is a block diagram illustrating a configuration of a control apparatus according to the first embodiment.

Next, a configuration of the control apparatus 20 illustrated in FIG. 1 will be described, by use of FIG. 3. FIG. 3 is a block diagram illustrating the configuration of the control apparatus according to the first embodiment. As illustrated in FIG. 3, this control apparatus 20 is formed of the collection management device 21, the analysis device 22, the control determination device 23, the analyzing device 24, and the communication control device 25.

The control apparatus 20 observes communication traffic flowing in the communication apparatus 10, and instructs the communication control device 12 of the communication apparatus 10 and/or the communication control device 25 of the control apparatus 20, to perform communication mode control by changing the communication mode if the communication traffic is determined to be abnormal communication (malicious communication, or communication not able to be concluded to be malicious but different from a behavior of normal communication) or is determined to be malicious communication, and to perform security control if it is determined that the communication traffic is malicious and communication blockage is needed.

The collection management device 21 has a collection unit 21a and an extraction control unit 21b. The collection unit 21a collects partial information from the communication apparatus 10 and transmits the collected partial information to the analysis device 22. The extraction control unit 21b transmits the collection rule to the collection device 11 in advance.

The analysis device 22 analyzes the partial information received from the communication apparatus 10 via the collection management device 21, and determines whether or not communication in the user network is abnormal, by using the analysis result analyzed. Further, the analysis device 22 has an analysis/learning unit 22a and a storage unit 22b. The storage unit 22b stores therein rules that become determination criteria for determining abnormality of communication.

The analysis/learning unit 22a analyzes the partial information received from the collection management device 21 by machine learning, such as abnormality detection, and notifies the control determination device 23 of the analysis result. Further, the analysis/learning unit 22a updates a learnt result of machine learning as model information and stores the updated model information in the storage unit 22b.

The analysis/learning unit 22a may use, for example, the local outlier factor (LOF) or the like, which is a density based outlier detection method, as a method of the analysis and learning. The analysis and machine learning will now be described in detail. Firstly, for feature vectorization, elements forming a feature vector are defined and registered in the analysis device 22 in advance.

For a communication packet, for example, elements required for the analysis and learning are defined in advance, from various pieces of information obtainable from the communication packet, the various pieces of information including transmission source/destination IP addresses or MAC addresses, a protocol number (a number indicating TCP/UDP or the like), a port number, authentication information of a data portion ("1" if available and "0" if unavailable, for example), a data size, and identification information identifying an application being used in the communication; and if an input of a packet is received, this packet is decomposed and the defined required elements (the IPv4 address may be formed of plural elements each being an element of 8 bits, for example) are extracted, and a feature vector formed of these elements (an n-dimensional numerical vector if the number of elements is "n") is generated.

This may be performed by the extraction unit 11a based on the collection rule of the collection device 11, and anyway, information required in feature vectorization may be transmitted as partial information from the collection device 11 to the collection management device 21, and the collection management device 21 may generate a feature vector from this partial information.

For abnormality determination (analysis), when input information that has been feature vectorized is given as an input to model information (for example, a feature vector group, which is one or more sets classified by predetermined learning or a classification algorithm), which is a result of learning so far stored in the storage unit 22b of the analysis device 22, whether the input is abnormal (or of anomaly expressed with a degree of deviation from a normal model) or not abnormal is able to be determined based on distance or density of space.

For the learning, feature vectors are stored in the predetermined storage unit 22b and the stored feature vector group is classified based on a predetermined learning algorithm. As the learning algorithm for abnormality detection, for example, LOF is applicable. In the learning, feature vector information is stored in the storage unit 22b, and feature information (for classification, a boundary line or the like delineated for classifying sets) of sets are derived from the feature vector information group stored in the storage unit 22b. Analysis becomes possible by use of this feature information. More diverse and many more feature vectors are reflected in the model information by the learning, and thereby, accuracy of the analysis using the model information is able to be increased.

The control determination device 23 has a determination unit 23a, a control instruction unit 23b, and a storage unit 23c. The storage unit 23c stores therein state information and the like of each of the communication control devices 12 and 25. The storage unit 23c stores, in association with each user or each user NW 30, the state information indicating, for example, routing control of which communication traffic of which user or user NW 30 is performed in which communication mode, history of transition of communication modes, and what sort of security control is being performed.

The determination unit 23a determines a communication mode by using the analysis result analyzed by the analysis device 22. Specifically, when the determination unit 23a receives the analysis result from the analysis device 22, the determination unit 23a determines, based on the analysis result, the communication mode of the communication control device 12.

If the communication is determined to be abnormal by the analysis device 22, the control instruction unit 23b controls the communication route for the communication control device 12 in the user NW 30, such that information related to the communication determined to be abnormal (communication corresponding to the feature vector determined to be abnormal as the analysis result) is transferred (goes through, or is subjected to mirroring) from the communication control device 12 to the analyzing device 24. Further, if communication in the user NW 30 is determined to be malicious communication by the analyzing device 24, the control instruction unit 23b controls the malicious communication to be restricted.

For example, if the communication mode determined by the determination unit 23a is different from the current communication mode, the control instruction unit 23b transmits a communication mode control instruction to each of the communication control devices 12 and 25 so that each of the communication control devices 12 and 25 complies with the determined communication mode. Further, when the control instruction unit 23b receives an analyzed result from the analyzing device 24 and determines that security control is required, the control instruction unit 23b transmits a security control instruction to the communication control device 12 (and/or 25).

Figure 4:
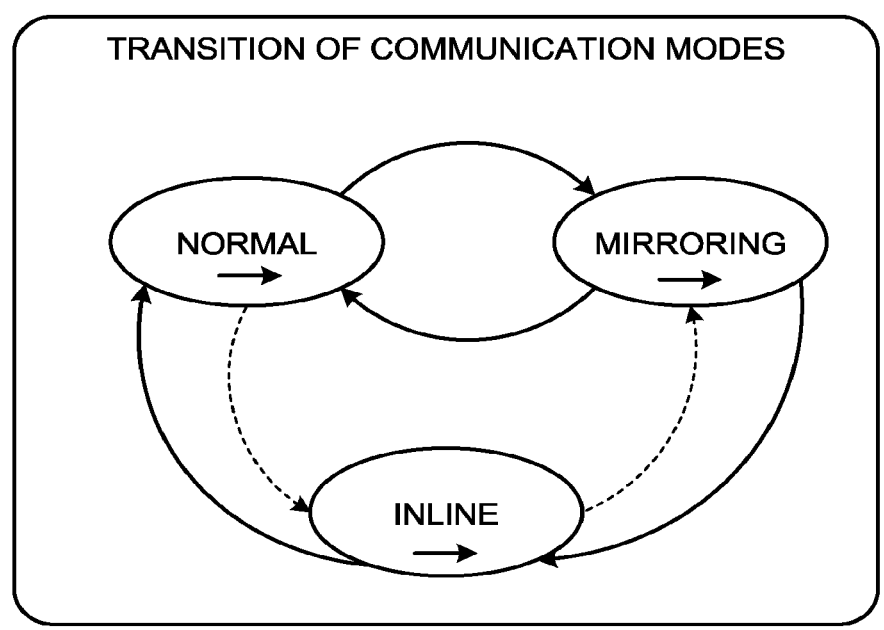
FIG. 4 is a diagram illustrating transition among communication modes.

The control rules stored in the storage units 12a and 25b of the communication control devices 12 and 25 will now be described. The control rules are rules for routing control based on communication modes and for security control. As illustrated in FIG. 4, as the communication modes, a normal mode, the mirroring mode, and the inline mode are prescribed, and according to a result of the determination of the control determination device 23 in consideration of an analysis result of the analysis device 22, the respective communication control devices 12 and 25 make transition to the respective modes.

If the communication mode is the normal mode, a routing control rule is set for the communication control device 12 of the communication apparatus 10 having a communication interface communicating with the internal NW (user NW 30) and a communication interface communicating with the external NW 60, the routing control rule for performing control such that communication traffic received by bridging/switching and routing processing is transferred as is to a destination.

Further, if the communication mode is the mirroring mode or the inline mode, a tunnel is constructed between the communication control device 12 and the opposite communication control device 25. This tunnel may be constructed statically, or if the tunnel has not been constructed at a moment when the communication mode is switched over to the mirroring mode or the inline mode, the tunnel may be constructed dynamically. In this case, at a moment when the mirroring mode or the inline mode is switched back to the normal mode, the tunnel that has been constructed may be deleted dynamically.

In the mirroring mode, a routing control rule is set for the communication control device 12 of the communication apparatus 10, the routing control rule for performing control such that the communication traffic received from the communication interface communicating with the internal NW or the communication interface communicating with the external NW 60 is transferred as is to the destination and the received communication traffic is mirrored to the opposite side of the tunnel and transferred via the tunnel. A routing control rule is set for the communication control device 25 of the control apparatus 20, the routing control rule for performing control such that the communication traffic received via the tunnel from the opposite side of the tunnel is transferred to the analyzing device 24.

In the inline mode, a routing control rule is set for the communication control device 12 of the communication apparatus 10, the routing control rule for performing control such that: the communication traffic received from the communication interface communicating with the internal NW is transferred via the tunnel to the opposite side of the tunnel; the communication traffic received from the communication interface communicating with the external NW 60 is transferred via the tunnel to the opposite side of the tunnel; and the communication traffic received via the tunnel from the opposite side of the tunnel is transferred to the original destination. Further, a routing control rule is set, the routing control rule for performing control such that the communication traffic received via the tunnel from the communication control device 25 of the control apparatus 20 is transferred to the destination of the communication traffic.

A routing control rule is set for the communication control device 25 of the control apparatus 20, the routing control rule for performing control such that the communication traffic received via the tunnel from the opposite side of the tunnel is transferred to the analyzing device 24 and the communication traffic received from the analyzing device 24 is transferred via the tunnel to the opposite side of the tunnel.

The security control blocks malicious communication and communication determined to be suspicious communication (corresponding to "gray" in the determination of clean/dark/gray) satisfying a predetermined condition. The blockage of suspicious communication satisfying the predetermined condition is precautionary blockage on the safe side, and if the communication is determined to be normal communication after the blockage, a control instruction to cancel this blockage is transmitted at that time point. The control determination device 23 instructs the communication control device 12 and/or 25 to block the communication that has been determined to be blocked. For example, if control of blockage is possible at a level of the IP address or IP address range of the layer 3, at a level of the TCP/UDP or the port number of the layer 4, or in the application layer, a particular application to be blocked is identified from the communication traffic, and that application communication is blocked by use of information that enables the corresponding application to be identified. If a URL filter is applicable, control may be performed such that a particular URL or FQDN to be blocked is set in the filter. If a mail filter is applicable, control may be performed such that a particular mail address or domain to be blocked is set in the filter. Information required in setting of the security control, such as the blockage, is included in the analyzed result output by the analyzing device 24, and the control determination device 23 performs control by using the analyzed result received and instructing the communication control device.

When communication is determined to be abnormal by the determination unit 23a of the control determination device 23, the analyzing device 24 receives the communication transferred by the routing control based on the mirroring mode if the processing is functioning in the mirroring mode, analyzes this communication, and determines whether or not the communication in the user NW 30 is malicious communication.

The analyzing device 24 has a detail analyzing unit 24a. The detail analyzing unit 24a deeply analyzes the content of the communication traffic, determines which of clean (normal communication), dark (malicious communication), gray (communication unable to be concluded to be clean or dark) the communication is, and transmits a result of the determination, together with a group formed of at least one or more of transmission source and destination IP addresses and port numbers, application identification information, and the like representing the communication to be determined, to the control determination device 23.

The communication control device 25 has a tunneling unit 25a, a storage unit 25b, and the communication control unit 25c. The tunneling unit 25a constructs a tunnel to the communication control device 12 of the opposite communication apparatus 10. For example, the tunneling unit 25a constructs the tunnel to the communication control unit 12c of the opposite communication control device 12 in order to flow the communication traffic to the analyzing device 24, in the mirroring mode or the inline mode.

The storage unit 25b stores therein control rules required in communication mode control and security control. The communication control unit 25c performs the communication mode control based on the communication modes. Further, the communication control unit 25c performs the security control.

Figure 5:
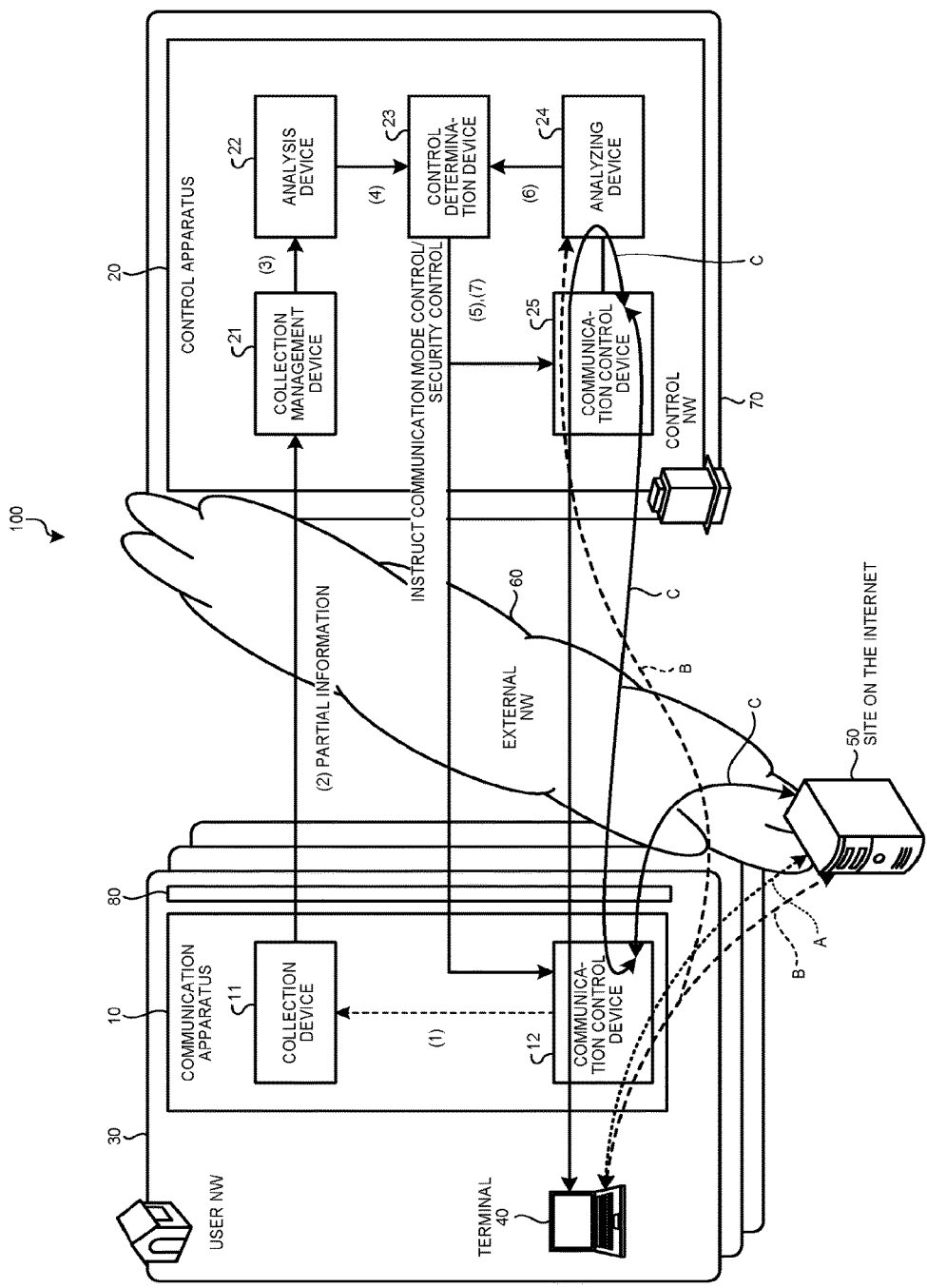
FIG. 5 is a diagram illustrating a sequential flow of communication control processing by the network system according to the first embodiment.

By use of FIG. 5, a sequential flow of communication control processing by the network system 100 according to the first embodiment will be described. FIG. 5 is a diagram illustrating the sequential flow of the communication control processing by the network system according to the first embodiment.

As illustrated in FIG. 5, the collection device 11 collects communication traffic or a part of the communication traffic, which flows in the user NW 30 and goes through the communication control device 12 (see (1) in FIG. 5). The collection device 11 then transmits it as partial information of the communication traffic to the collection management device 21 of the control apparatus 20 (see (2) in FIG. 5).

Subsequently, the collection management device 21 collects the partial information transmitted from the collection device 11 and transmits the collected partial information to the analysis device 22 (see (3) in FIG. 5). The analysis device 22 performs analysis by machine learned abnormality detection or the like on the partial information received from the collection management device 21, and outputs a result of the analysis to the control determination device 23 (see (4) in FIG. 5).

Thereafter, the control determination device 23 determines a communication mode based on the analysis result received from the analysis device 22, and instructs each of the communication control devices 12 and 25 to perform communication mode control according to the communication mode (see (5) in FIG. 5). Further, the analyzing device 24 deeply analyzes the received communication traffic, determines whether or not the received communication traffic is malicious communication infected with malware or the like, and outputs a result of the determination to the control determination device 23 (see (6) in FIG. 5).

The control determination device 23 determines, based on the analyzed result received from the analyzing device 24, a communication mode and the content of the security control, and instructs each of the communication control devices 12 and 25 to perform communication control according to the determination (see (7) in FIG. 5). For example, if the communication mode is the normal mode, the communication control device 12 transfers the communication between the terminal 40 and a site 50 on the Internet as is to the destination (see an arrow A in FIG. 5). Further, for example, if the communication mode is the mirroring mode, the communication control device 12 transfers the communication as is to the destination (the site 50 on the Internet or the terminal 40), and performs mirroring of this bidirectional communication and transfers the bidirectional communication also to the analyzing device 24 via the communication control device 25 of the control apparatus 20 (see an arrow B in FIG. 5). Further, if the communication mode is the inline mode, the communication control device 12 transfers the communication between the terminal 40 and the site 50 on the Internet to the destination via the peripheral router at the user NW 30 side by causing the communication to go through the communication control device 12, the communication control device 25, and the analyzing device 24. More specifically, if the communication is from the terminal 40 to the site 50 on the Internet, the communication goes, from the terminal 40, through the communication control device 12 and the communication control device 25, to the analyzing device 24, and is turned back therefrom and transmitted to the site 50 on the Internet via the communication control device 25 and the communication control device 12. If the communication is from the site 50 on the Internet to the terminal 40, the communication has a sequence reverse to this (see an arrow C in FIG. 5).

Example of Processing of Network System

Figure 6:
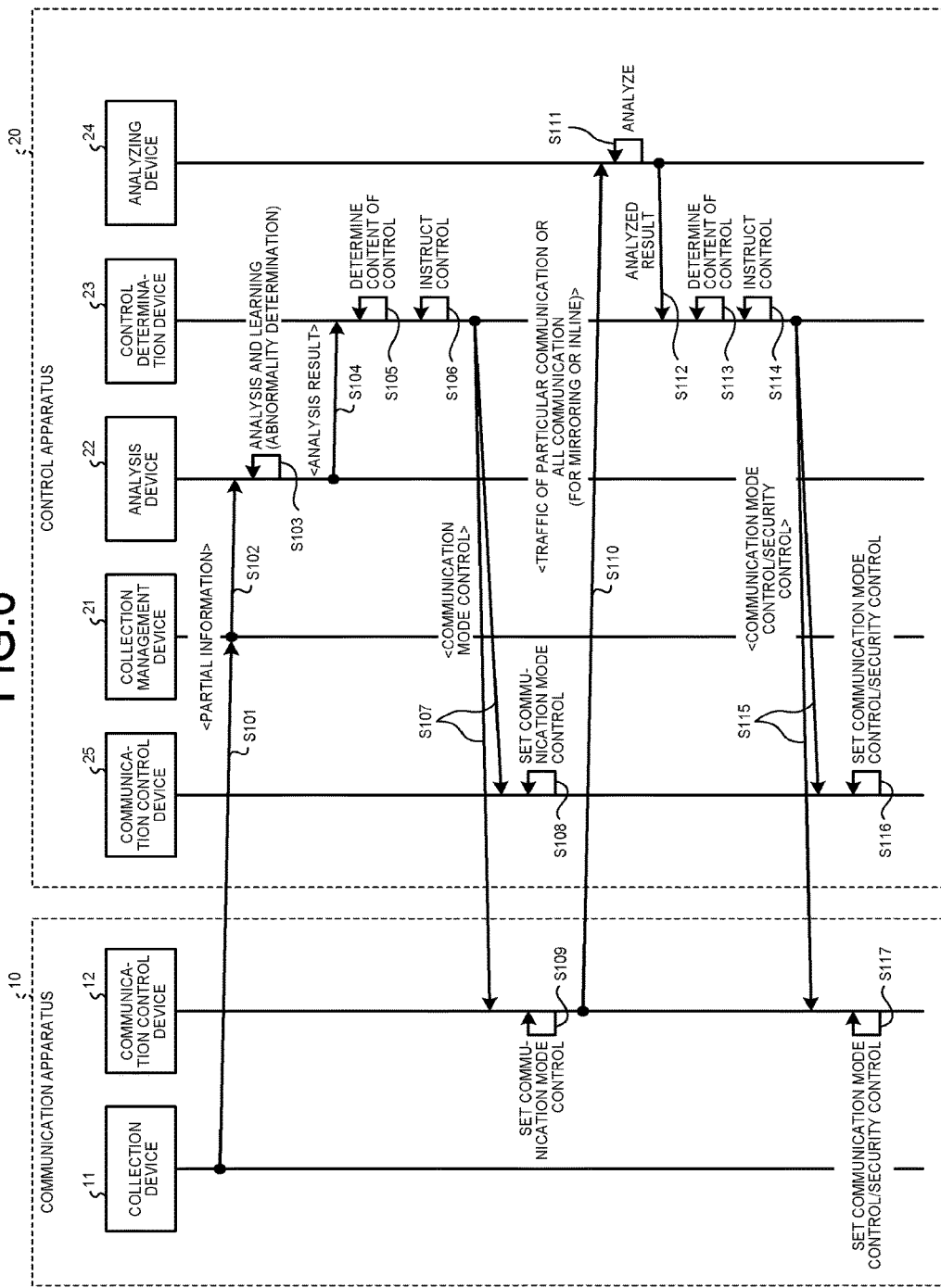
FIG. 6 is a sequence diagram illustrating a flow of the communication control processing in the network system according to the first embodiment.

Next, by use of FIG. 6, a flow of communication control processing in the network system 100 according to the first embodiment will be described. FIG. 6 is a sequence diagram illustrating the flow of the communication control processing in the network system according to the first embodiment.

As illustrated in FIG. 6, the collection device 11 collects communication traffic or a part of the communication traffic, which flows in the user NW 30 and goes through the communication control device 12, and transmits it as partial information of the communication traffic to the collection management device 21 of the control apparatus 20 (Step S101). Subsequently, the collection management device 21 collects the partial information transmitted from the collection device 11 and transmits the collected partial information to the analysis device 22 (Step S102).

The analysis device 22 performs analysis, for example, by machine learned abnormality detection or the like on the partial information received from the collection management device 21 (Step S103). The analysis device 22 outputs an analysis result to the control determination device 23 (Step S104).

Thereafter, the control determination device 23 determines, based on the analysis result received from the analysis device 22, a communication mode as the content of control (Step S105), instructs each of the communication control devices 12 and 25 to perform communication mode control according to the communication mode (Step S106), and notifies each of the communication control devices 12 and 25 of the content of control (Step S107). Each of the communication control devices 12 and 25 sets the notified communication mode control (Steps S108 and S109).

The communication control device 12 transmits communication traffic to the analyzing device 24 if the communication mode is the mirroring mode or the inline mode (Step S110). The analyzing device 24 deeply analyzes the received communication traffic (Step S111), determines whether or not the communication traffic is malicious communication infected with malware or the like, and outputs an analyzed result to the control determination device 23 (Step S112).

The control determination device 23 determines, based on the analyzed result received from the analyzing device 24, the communication mode and the content of security control (Step S113), instructs each of the communication control devices 12 and 25 to perform communication control according to a result of the determination (Step S114), and notifies each of the communication control devices 12 and 25, of the communication mode and the content of security control (Step S115). Each of the communication control devices 12 and 25 sets the notified communication mode and security control (Steps S116 and S117).

As described above, the control apparatus 20 arranged outside the user NW 30 efficiently collects partial information, which is a part of, or which is statistical information, of communication traffic flowing in the user NW 30, and performs analysis on the collected partial information of the communication traffic. If the partial information is determined, by the analysis, to be of a behavior of abnormal communication, the communication mode is changed so that the communication traffic in the user NW 30 to be monitored flows to the control apparatus 20.

Further, by the routing control of the communication in the mirroring mode or the inline mode due to the communication mode change, the communication traffic itself (the payload may also be targeted), which is not the partial information, is observed, and thereby is more deeply analyzed. If the communication traffic is determined to be malicious communication by the analyzing, the determination indicating that the communication traffic is infected with malware or the like, control is performed such that this communication traffic is temporarily or permanently blocked. If the communication traffic is determined to be not malicious and to be communication with normal behavior, the communication mode is changed to, for example, the normal mode.

By observing partial information of the communication traffic in the user NW 30 at ordinary times, influence on communication performance of the user NW 30 is reduced. Determination of abnormality detection is then performed in this observation. This is continued at predetermined moments. If the communication traffic is determined to be abnormal, that communication traffic is deeply analyzed, and if the communication is further determined to be malicious communication, security control is executed with respect to that communication traffic.

Example of Processing of Collection Device

Figure 7:
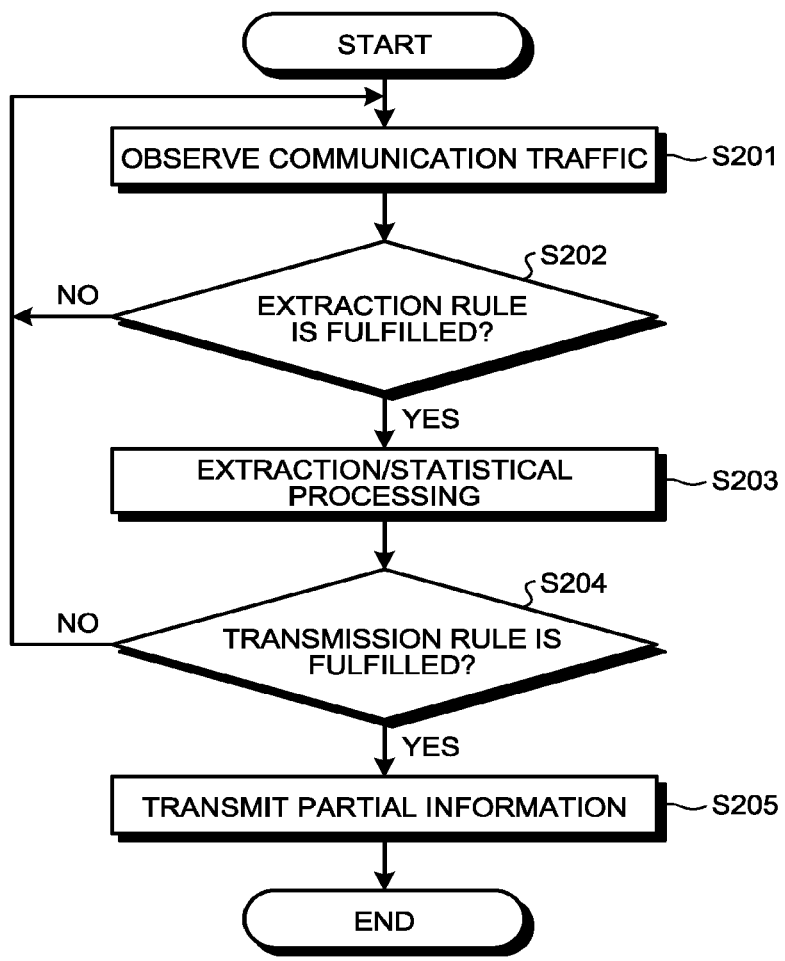
FIG. 7 is a flow chart illustrating a flow of collection processing in a collection device according to the first embodiment.

Next, by use of FIG. 7, a flow of collection processing in the collection device 11 will be described. FIG. 7 is a flow chart illustrating the flow of the collection processing in the collection device according to the first embodiment.

As illustrated in FIG. 7, the collection device 11 observes communication traffic (Step S201), and determines whether the communication traffic fulfills the extraction rule (Step S202). As a result, if the communication traffic fulfills the extraction rule (Step S202; Yes), information related to the communication is extracted or statistically processed (Step S203).

When the collection device 11 extracts or statistically processes the information related to the communication, the collection device 11 determines whether or not the transmission rule is fulfilled (Step S204). For example, the collection device 11 determines whether a predetermined time interval prescribed by the transmission rule has elapsed, or whether a predetermined number of packets prescribed by the transmission rule have been collected.

As a result, if the transmission rule has been fulfilled (Step S204; Yes), the collection device 11 transmits the partial information to the collection management device 21 (Step S205). If the communication traffic does not fulfill the extraction rule (Step S202; No), or if the transmission rule is not fulfilled (Step S204; No), the processing is repeated by being returned to the processing of Step S201.

Example of Processing of Control Apparatus

Figure 8:
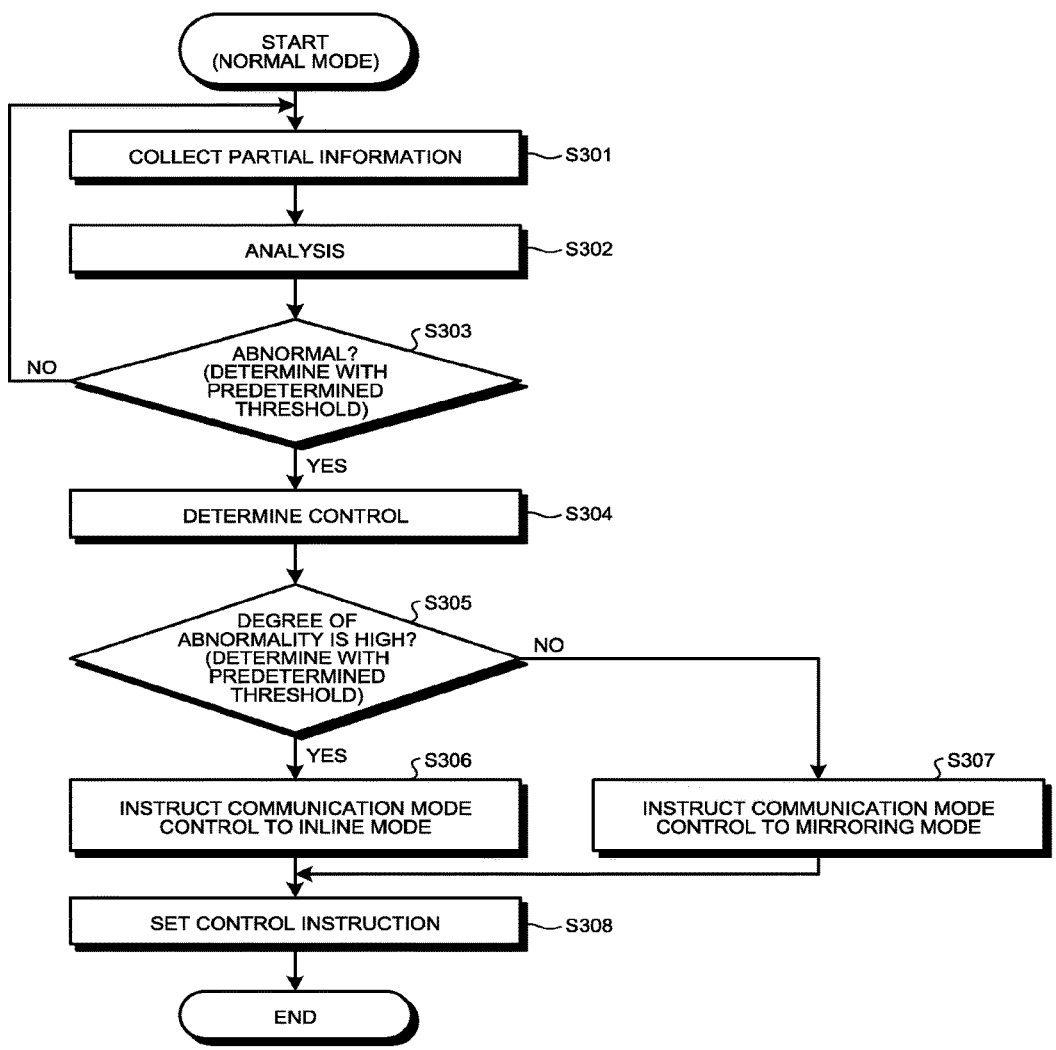
FIG. 8 is a flow chart illustrating a flow of communication control processing in a normal mode of the control apparatus according to the first embodiment.
Figure 9:
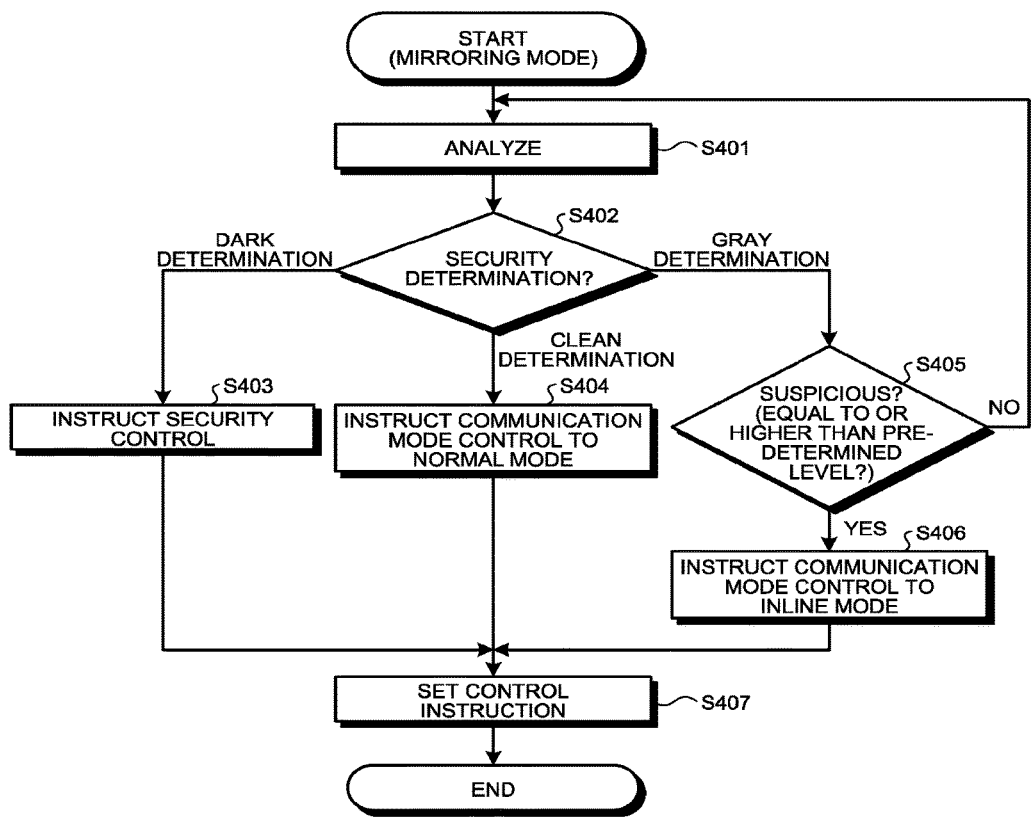
FIG. 9 is a flow chart illustrating a flow of communication control processing in a mirroring mode of the control apparatus according to the first embodiment.
Figure 10:
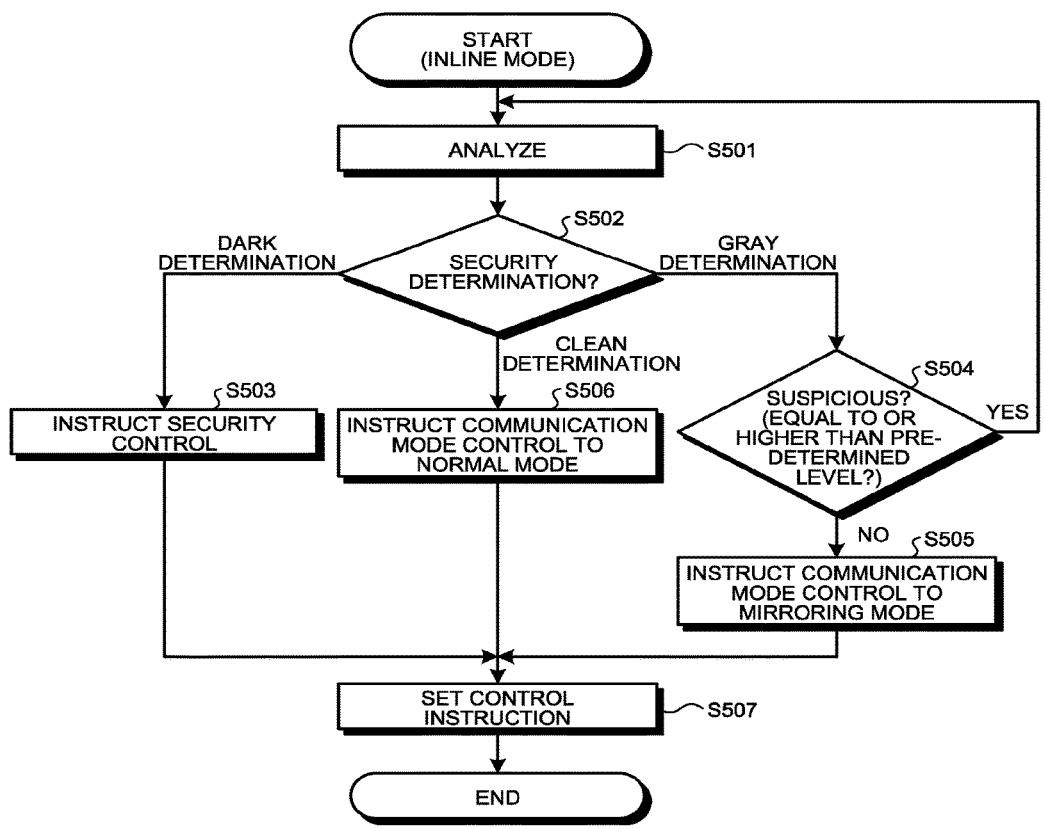
FIG. 10 is a flow chart illustrating a flow of communication control processing in an inline mode of the control apparatus according to the first embodiment.

Next, by use of FIG. 8, FIG. 9, and FIG. 10, a flow of communication control processing in the control apparatus 20 will be described. FIG. 8 is a flow chart illustrating a flow of communication control processing in the normal mode of the control apparatus according to the first embodiment. FIG. 9 is a flow chart illustrating a flow of communication control processing in the mirroring mode of the control apparatus according to the first embodiment. FIG. 10 is a flow chart illustrating a flow of communication control processing in the inline mode of the control apparatus according to the first embodiment.

First, the communication control processing in the normal mode will be described by use of FIG. 8. As illustrated in FIG. 8, the collection management device 21 of the control apparatus 20 collects the partial information transmitted from the collection device 11 (Step S301). The analysis device 22 performs analysis, for example, by machine learned abnormality detection or the like on the partial information received from the collection management device 21 (Step S302).

The analysis device 22 determines whether or not the communication in the user NW 30 is abnormal by using an analysis result that has been analyzed (Step S303). As a result, if the analysis device 22 determines that the communication is not abnormal (Step S303; No), the processing is returned to the processing of Step S301. Further, if the communication is determined to be abnormal (Step S303; Yes), the control determination device 23 determines, based on the analysis result received from the analysis device 22, the communication mode as the content of control (Step S304).

The control determination device 23 determines whether or not a degree of the abnormality in the communication is higher than a predetermined threshold (Step S305). As a result, if the degree of the abnormality in the communication is higher than the predetermined threshold (Step S305; Yes), the control determination device 23 instructs each of the communication control devices 12 and 25 to perform communication mode control for transition to the inline mode (Step S306). Further, if the degree of the abnormality in the communication is equal to or lower than the predetermined threshold (Step S305; No), the control determination device 23 instructs each of the communication control devices 12 and 25 to perform communication mode control for transition to the mirroring mode (Step S307). Each of the communication control devices 12 and 25 sets the communication mode control that has been instructed (Step S308). If the processing is executed with only two communication modes, the normal mode, and the mirroring mode or inline mode, Step S305 is omitted, and Step S306 or Step S307 is alternatively selected.

Next, the communication control processing in the mirroring mode will be described by use of FIG. 9. As illustrated in FIG. 9, in the mirroring mode, the analyzing device 24 deeply analyzes communication traffic received from the communication control device 12 (Step S401), and determines which of "dark" indicating that the communication is malicious, "clean" indicating that the communication is not malicious, and "gray" indicating that the communication is unable to be determined as clean or black, the communication is (Step S402).

As a result, if the analyzing device 24 determines the communication to be "dark", the control determination device 23 instructs each of the communication control devices 12 and 25 to perform security control, such as packet filtering (Step S403), and proceeds to Step S407.

Further, if the analyzing device 24 determines the communication to be "clean", the control determination device 23 instructs each of the communication control devices 12 and 25 to perform communication mode control for transition to the normal mode (Step S404), and proceeds to Step S407.

Further, if the analyzing device 24 determines the communication to be "gray", the control determination device 23 determines whether or not the communication is suspicious, that is, the determination result of being "gray" is equal to or higher than a predetermined level (Step S405). For example, if there are five levels from "5" close to "dark" to "1" close to clean, whether or not equal to or higher than "3" is determined.

As a result, if it is equal to or higher than the predetermined level (Step S405; Yes), the control determination device 23 instructs each of the communication control devices 12 and 25 to perform communication mode control for transition to the inline mode (Step S406), and proceeds to Step S407. If it is not equal to or higher than the predetermined level (Step S405; No), the processing is returned to the processing of Step S401 and the above described processing is repeated. At Step S407, the communication control device 25 sets the communication mode and security control that have been instructed, and ends the processing. If the processing is executed with only two communication modes, the normal mode and the mirroring mode, Step S405 and Step S406 are omitted, and if the communication is determined to be "gray" in Step S402, the processing may be returned to the processing of Step S401. Further, by presetting, in order to increase safety further, the gray determination may be treated as the dark determination, or in order to avoid damage by excessive communication blockage, the gray determination may be treated as the clean determination.

Next, the communication control processing in the inline mode will be described by use of FIG. 10. As illustrated in FIG. 10, in the inline mode, the analyzing device 24 deeply analyzes the communication traffic received from the communication control device 12 (Step S501), and determines which of "dark" indicating that the communication is malicious, "clean" indicating that the communication is not malicious, and "gray" indicating that the communication is unable to be determined as clean or dark, the communication traffic is (Step S502).

As a result, if the analyzing device 24 determines the communication traffic to be "dark", the control determination device 23 instructs each of the communication control devices 12 and 25 to perform security control, such as packet filtering (Step S503), and proceeds to Step S507.

Further, if the analyzing device 24 determines the communication traffic to be "gray", the control determination device 23 determines whether the communication is suspicious, that is, whether or not the result of the determination indicating that the communication traffic is "gray" is equal to or higher than a predetermined level (Step S504). For example, if there are five levels from "5" close to "dark" to "1" close to "clean", whether or not the result of the determination is equal to or higher than "3" is determined.

As a result, if the determination result is not equal to or higher than the predetermined level (Step S504; No), the control determination device 23 instructs each of the communication control devices 12 and 25 to perform communication mode control for transition to the mirroring mode (Step S505), and proceeds to Step S507. If the determination result is equal to or higher than the predetermined level (Step S504; Yes), the processing is returned to the processing of Step S501 and the above described processing is repeated.

Further, if the analyzing device 24 determines the communication traffic to be "clean", the control determination device 23 instructs each of the communication control devices 12 and 25 to perform communication mode control for transition to the normal mode (Step S506), and proceeds to Step S507. At Step S507, the communication control device 25 sets the communication mode and security control that have been instructed, and ends the processing. If the processing is executed with only two communication modes, the normal mode and the inline mode, Step S504 and Step S505 are omitted, and if the communication is determined to be "gray" in Step S502, the processing may be returned to the processing of Step S501. Further, by presetting, in order to increase safety further, the gray determination may be treated as the dark determination, or in order to avoid damage by excessive communication blockage, the gray determination may be treated as the clean determination.

Effects of First Embodiment

As described above, in the network system 100 according to the first embodiment, the communication apparatus 10 transmits as partial information, partial information or information statistically processed, from information related to communication going through the communication apparatus 10, to the control apparatus 20. The control apparatus 20 analyzes the partial information received from the communication apparatus 10, and determines whether or not the communication in the user network NW 30 is abnormal, by using an analysis result that has been analyzed. If the communication in the user NW 30 is determined to be abnormal, the control apparatus 20 performs routing control by changing the communication mode, performs analyzing by using the communication flowing in the user NW 30, and determines whether or not the communication in the user NW 30 is malicious communication. If the communication in the user NW 30 is determined to be abnormal, the control apparatus 20 controls the communication apparatus 10 in the user NW 30 such that information related to the communication determined to be abnormal (for example, the communication traffic having a feature determined to be abnormal) is transferred from the communication apparatus 10 to the analyzing device 24. If the communication in the user NW 30 is determined to be malicious communication by the analyzing device 24, control is performed such that the malicious communication is restricted.

Thereby, the network system 100 according to the first embodiment enables malicious communication to be detected and user communication to be appropriately protected, with excessive use of the band of the communication line for access from the user NW 30 to the Internet or the like that is the external NW 60 prevented and reduction in accuracy related to detection of abnormal or malicious communication prevented. That is, at ordinary times, the control apparatus 20 performs analysis on the partial information collected in the communication apparatus 10 and executes processing of detecting abnormality, and if abnormality is detected, information related to the communication in the user NW 30 is transferred to the analyzing device 24, and malicious communication is determined and the malicious communication is dealt with by deep analysis on all data that have been transferred, with the IDS, intrusion prevention system (IPS), or the like. Thereby, malicious communication is able to be determined and the malicious communication is able to be dealt with, with excessive use of the band of the user NW line and reduction in accuracy related to the detection of abnormal or malicious communication being prevented.

Second Embodiment

In the above described first embodiment, the case where the partial information is subjected to analysis by machine learning, such as abnormality detection, and a result of the machine learning is updated as the model information has been described, but the model information may be updated by reflecting or adding the analyzed result by the analyzing device 24 in the model information of the analysis device 22.

For example, for the model information, which is the learned result of the abnormal detection in the analysis device 22, whether or not the communication corresponds to an abnormal spatial region is determined by use of a predetermined threshold, based on density, distance, or the like of a feature vector group forming the model information. "Abnormal" herein means "being different from being normal and at this time point, not necessarily being able to be concluded to be malicious communication".

In this second embodiment, a case will be described as an example, the case where a label (clean/dark/gray), which is a result of the determination obtained by the analyzing device 24, and a feature vector formed from the communication traffic corresponding to this result of the determination are made into a pair, and the pair is mapped to the model information. Description of any processing similar to that of the first embodiment will be omitted.

FIG. 11 is a diagram illustrating a sequential flow of communication control processing by a network system according to the second embodiment. As illustrated in FIG. 11, in the control apparatus 20 according to the second embodiment, when the analysis device 22 performs analysis by machine learned abnormality detection or the like, the analysis device 22 outputs a result of the analysis to the control determination device 23 (see (4) in FIG. 11), and stores the analysis result as model information of the machine learning.

The control determination device 23 determines, based on an analyzed result received from the analyzing device 24, a communication mode and a content of security control, instructs each of the communication control devices 12 and 25 to perform communication control according to the determination (see (7) in FIG. 11), and thereafter, transmits the analyzed result received from the analyzing device 24 to the analysis device 22. The analysis device 22 maps the analyzed result received from the analyzing device 24 onto a space of the model information of the analysis device 22 (see (8) in FIG. 11).

Processing of mapping the analyzed result onto the space of the model information will now be described by use of an example in FIG. 12. FIG. 12 is a conceptual diagram of mapping to a feature vector space. As illustrated in FIG. 12, in the feature vector space, feature vectors of abnormality detection by the analysis device 22 in the normal mode and feature vectors corresponding to results of determination by the analyzing device 24 are present.

Labels indicating the results of the determination by the analyzing device 24 are appended to the feature vectors corresponding to the results of the determination by the analyzing device 24. Feature vectors corresponding to a predetermined region including the feature vectors corresponding to the results of the determination by the analyzing device 24 are controlled according to determination criteria based on the labels. For example, if a result determined to be "dark" is mapped as a label to a spatial region determined to be "abnormal", the communication is determined to be malicious communication, rather than being abnormal. Limitation is not made to a case where all of labels, "dark", "clean", and "gray", are appended, and only those determined to be dark and/or clean may be labeled.

Further, for example, for a feature vector having a predetermined distance from a labeled feature vector, or for a feature vector having a density satisfying a predetermined relation with respect to a density of a labeled feature vector, determination based on the label may be made. Furthermore, for example, control rules indicating determination criteria may be determined in advance, and contents of control may be determined according to the control rules.

An example of the determination criteria will be described by use of FIG. 13. FIG. 13 is a diagram illustrating the example of the determination criteria used in the abnormality determination processing. As exemplified by FIG. 13, for each combination of "mapping information", which is an analyzed result by the analyzing device 24, and "model information", which is an analysis result by the analysis device 22, a communication mode is prescribed.

For example, if the model information is "spatial region determined to be abnormal", and mapping information indicating "clean determination" is in this region, when communication (feature vector) corresponding to this region is detected by analysis, communication mode control according to "normal mode" is performed. That is, the communication corresponds to the spatial region determined to be abnormal but has a label determined to be "clean", which does not correspond to malicious communication, and thus the communication mode is kept in the normal mode. In FIG. 13, "(or mirroring mode)" is written in brackets, the communication mode may be determined to be the one in the brackets, and whether to make the communication mode the normal mode or the mirroring mode may be selected in advance by a user or an administrator.

Further, for example, if the model information is "spatial region not determined to be abnormal", and mapping information indicating "dark determination" is in this region, when communication (feature vector) corresponding to this region is detected by analysis, "security control" is performed. That is, since the communication corresponds to the spatial region determined to be abnormal but has a label determined to be "dark", which corresponds to malicious communication, transition to the security control is made.

In the first embodiment, transition from the normal mode to the security control is not made, but in the second embodiment, by application of labels as described above, the content of abnormality is able to be reflected, and thus, for example, determination, such as determining the communication to be abnormal because the communication is malicious communication (dark), is able to be made, and transition from the normal mode to the security control is enabled.

This is applicable, not only to abnormality detection, but also to, for example, machine learning of clustering. By mapping results of security determination to respective clusters classified by machine learning, the respective clusters are able to be labeled. Clustering means grouping, in machine learning, those with highly related and highly similar feature values, and a classification target set is divided into subsets such that internal cohesion and external isolation are achieved.

A pair of a label and a feature vector used in this mapping processing is obtained by collection of information related to communication traffic flowing to the analyzing device 24, through: incorporation of a device equivalent to the collection device 11 separately into the analyzing device 24; arrangement of the collection device 11 before the analyzing device 24 (for example, between the analyzing device 24 and the communication control device 25) in an inline connection mode; or installation of the collection device 11 in a mirroring connection mode with respect to the communication traffic flowing to the analyzing device 24.

The device corresponding to the collection device 11 extracts the partial information to form the feature vector, and further, associates the feature vector with information corresponding to the label, which is a result of security determination by the analyzing device 24 and performs mapping to the model information of the analysis device 22. The feature vector and label information associated with each other may be stored in the storage unit 22*b* of the analysis device 22 via the control determination device 23. Further, the feature vector and label information associated with each other may be stored in the storage unit 23*c* of the control determination device 23, and in this case, the feature vector and label information associated with each other may, in combination with an analysis result output from the analysis device 22, be applied to security control determination.

That is, by giving meaning to (labelling) the spatial region of the feature vector, which is the result of analysis; based on the abnormality detection/analysis result, security control is able to be performed by omitting the change of the communication mode. Otherwise, determination may be made to make transition from the normal mode to the inline mode by omitting the mirroring mode, instead of making transition from the normal mode to the mirroring mode or inline mode based on the abnormality detection/analysis result.

Figure 14:
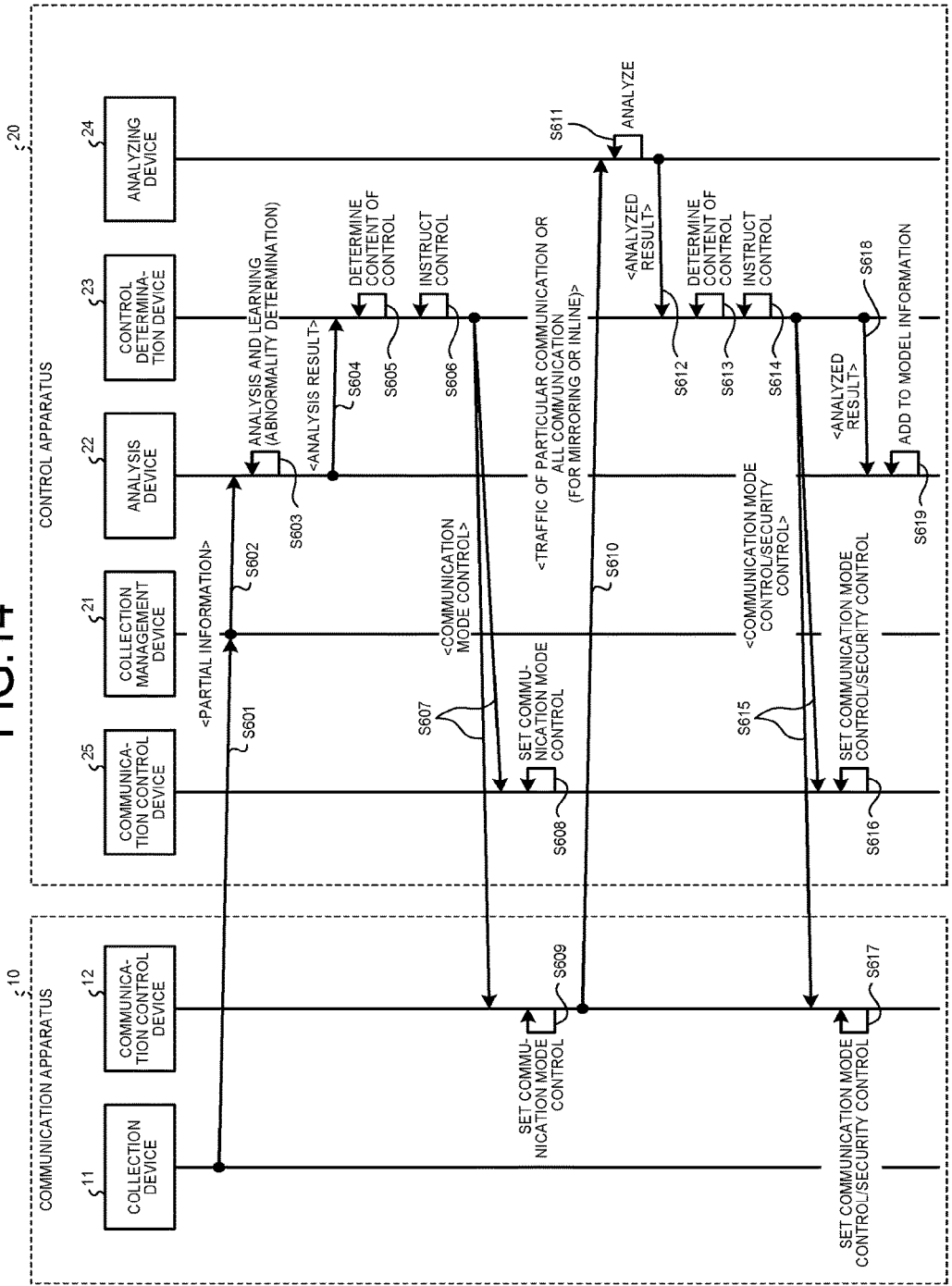
FIG. 14 is a sequence diagram illustrating a flow of the communication control processing in the network system according to the second embodiment.

Next, by use of FIG. 14, a flow of communication control processing in the network system 100 according to the second embodiment will be described. FIG. 14 is a sequence diagram illustrating the flow of the communication control processing in the network system according to the second embodiment. Since the processing from Step S601 to Step S617 in FIG. 14 is similar to Step S101 to Step S117 of the communication control processing in the network system 100 according to the first embodiment described with respect to FIG. 6, description thereof will be omitted.

Each of the communication control devices 12 and 25 sets the notified communication mode and security control (Steps S616 and S617), and thereafter, the control determination device 23 transmits an analyzed result received from the analyzing device 24 to the analysis device 22 (Step S618). The analysis device 22 maps the analyzed result received from the analyzing device 24 onto the space of the model information of the analysis device (Step S619).

Figure 15:
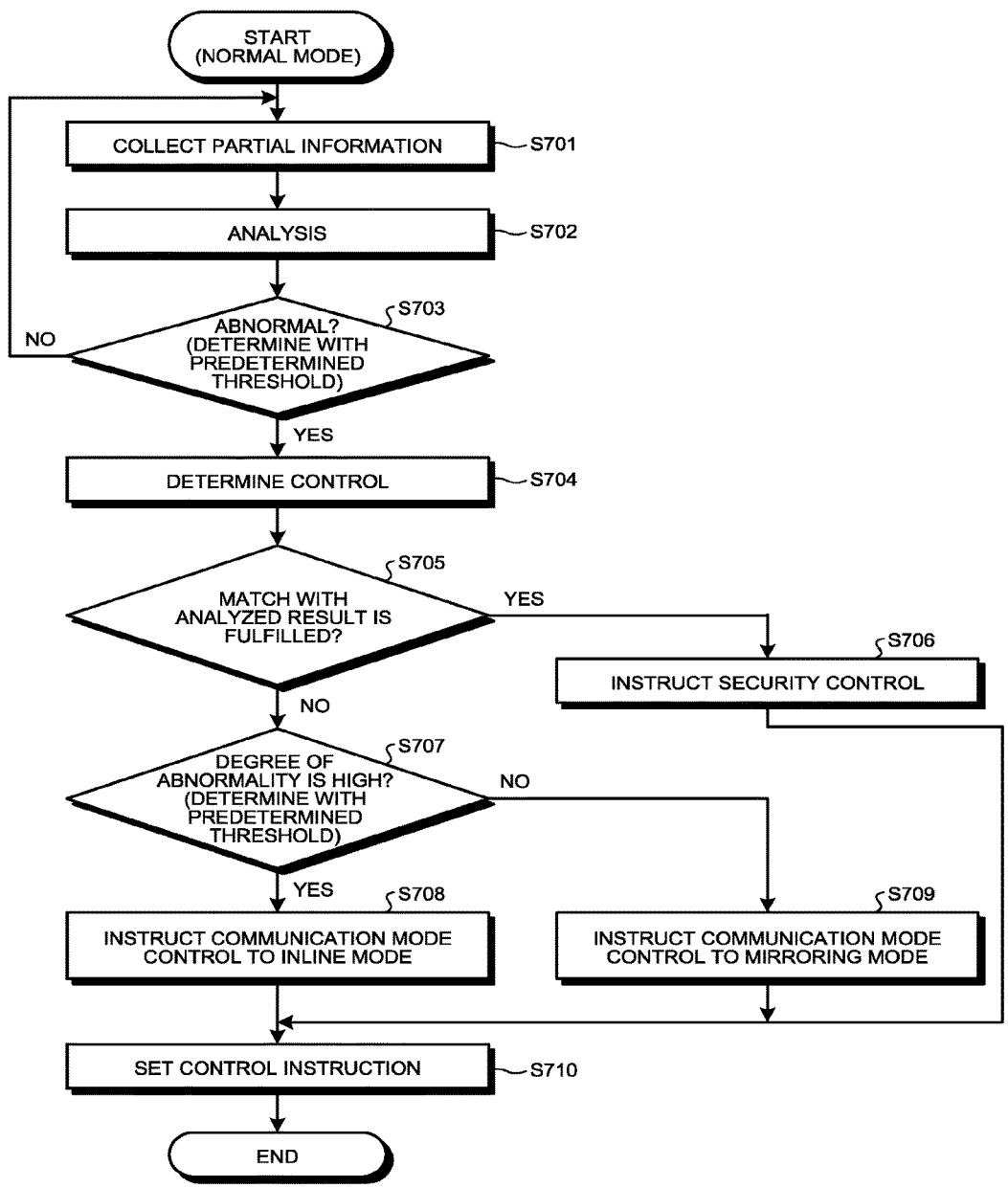
FIG. 15 is a flow chart illustrating a flow of communication control processing in a normal mode of a control apparatus according to the second embodiment.

Next, by use of FIG. 15, a flow of communication control processing in the control apparatus 20 will be described. FIG. 15 is a flow chart illustrating a flow of communication control processing in the normal mode of the control apparatus according to the second embodiment.

As illustrated in FIG. 15, when the control determination device 23 determines, based on the analysis result received from the analysis device 22 (Step S704), the communication mode as the content of control, the control determination device 23 determines whether or not a match with analyzed result is fulfilled (Step S705). For example, if the labeled feature vector corresponds to the spatial region according to the feature vector that is the above described analysis result (the clustered spatial region or the spatial region separating between abnormality and normality), a spatial region, which is the whole of this spatial region, or which is in this spatial region and within a predetermined distance or range from the labeled feature vector, is regarded as a spatial region represented by that label. The analysis device 22 determines whether or not it corresponds to this spatial region, and what the corresponding label is. As a result, if the match with analyzed result is fulfilled (Step S705; Yes), each of the communication control devices 12 and 25 is instructed to perform security control, such as packet filtering (Step S706).

That is, as described above, a label indicating the result of the determination by the analyzing device 24 is appended to a feature vector corresponding to the analyzed result (determination result) by the analyzing device 24. Therefore, feature vectors of partial information corresponding to a predetermined region including the feature vector corresponding to the determination result by the analyzing device 24 are controlled according to determination criteria based on labels. For example, if a result determined to be "dark" is mapped to a spatial region determined to be "abnormal", the communication is determined to be malicious communication, rather than being abnormal, and security control, such as packet filtering, is performed.

As described above, in the network system according to the second embodiment, a feature vector corresponding to an analyzed result by the analyzing device 24 is reflected in the model information of the analysis device 22 to update the model information, and thereby, meaning is able to be given to the model information, which is a result of machine learning, and the model information given with the meaning is able to be made a basis for determination of control.

Third Embodiment

In the above described first embodiment, a case where partial information of communication traffic is transmitted, based on the collection rule stored in the storage unit 11b, to the collection management device, has been described, but this collection rule may be updated as appropriate. Therefore, in a third embodiment below, a case where the control determination device 23 updates the collection rule as appropriate will be described. Description of processing similar to that of the first embodiment will be omitted.

Figure 16:
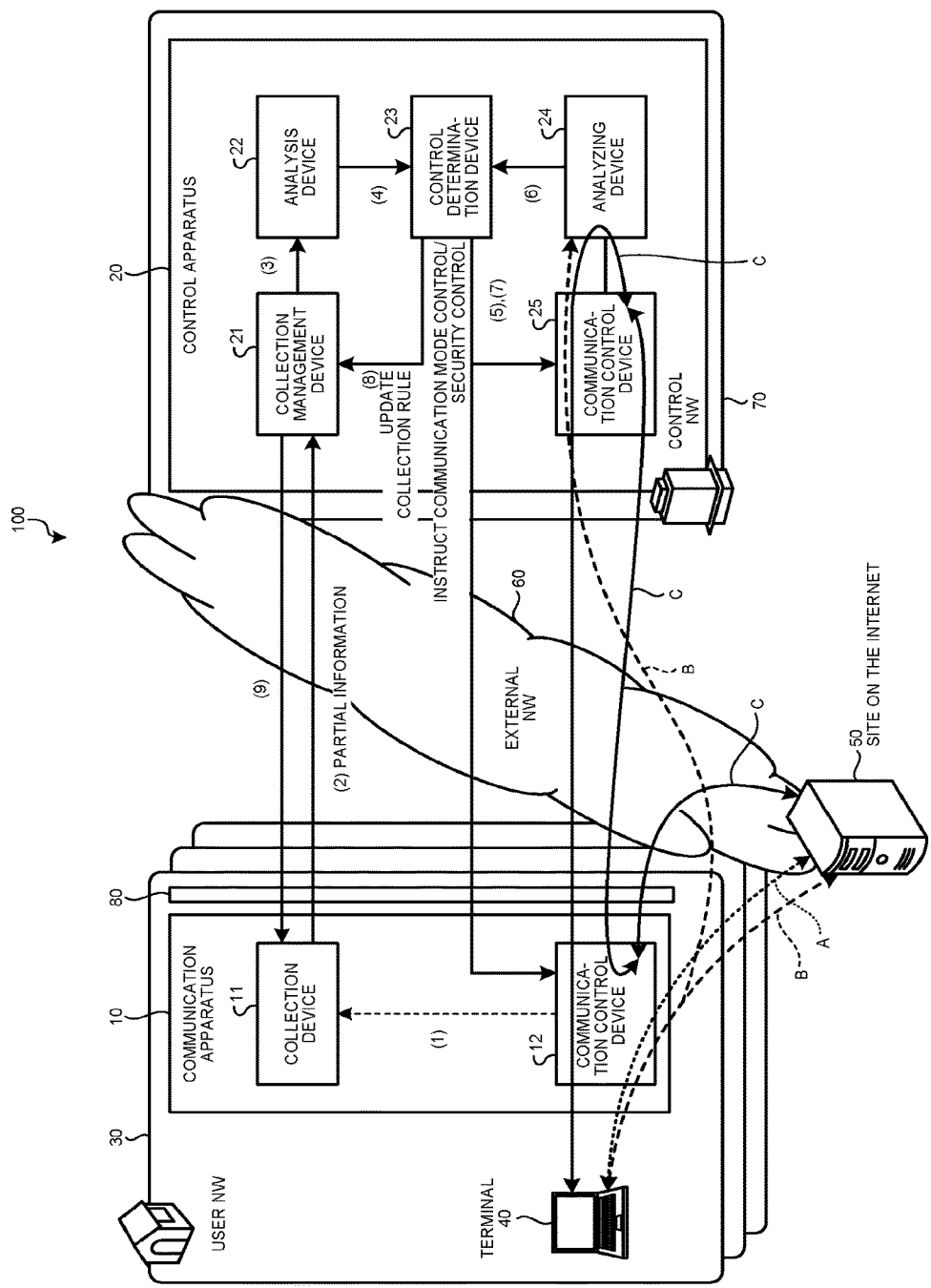
FIG. 16 is a diagram illustrating a sequential flow of communication control processing by a network system according to a third embodiment.

FIG. 16 is a diagram illustrating a sequential flow of communication control processing in a network system according to the third embodiment. As illustrated in FIG. 16, the control determination device 23 transmits an updated collection rule to the collection device 11 via the collection management device 21 (see (8) in FIG. 16). The collection device 11 updates the collection rule stored in the storage unit 11b (see (9) in FIG. 16). Thereafter, based on the updated collection rule, the collection device 11 transmits partial information to the collection management device 21 (see (6) in FIG. 16).

As described above, in the network system according to the third embodiment, in order to make determination more accurately, by the control determination device 23 updating the collection rule, the partial information to be collected is updated.

As to the update of the collection rule, for example, setting an arbitrary transmission source or destination IP address as the target may be changed to setting communication with an IP address overseas, or an IP address in a particular country or region overseas, which is not a domestically assigned IP address, as the target. Further, communication with an IP address managed by a particular ISP may be targeted.

Further, a time interval for collecting partial information, or a sampling rate may be updated, the sampling rate indicating: per how many packets partial information is collected; or per how many packets partial information is collected for a particular destination or for each transmission source. For example, instead of collecting partial information at ten minute intervals, the partial information may be collected at one minute intervals, or the sampling rate may be increased. Further, the protocol or port number of a target to be sampled may be specified, or the sampling rate may be increased by, for example, changing collection of the communication traffic of the protocol or port number per 100 packets to collection thereof per ten packets.

As to a method of determining a rule to be updated, by obtaining model information of abnormality detection, which is a learned result of machine learning, on a feature vector space, a feature vector or spatial region is able to be identified, the feature vector or spatial region being determined to be abnormal based on a density of a set of feature vectors, a feature vector and a distance between a set formed of feature vectors and a set, or the like; and thus updating to a rule enabling more communication traffic corresponding to feature vectors corresponding to this spatial region to be collected efficiently may be considered. Or, in order to form model information with various feature vectors, update may be performed such that partial information, for which a feature vector is still not on the feature vector space, or which corresponds to sparse space, is able to be collected.

Further, if the collection rule is updated based on the analyzed result, for example, with a case where dark determination has been output as the result a predetermined number of times or more in a predetermined time period being a condition, more partial information may be collected by shortening the time interval of collection or increasing the sampling rate. Further, for example, with a case where dark determination of the same type or similar type has been output as the result a predetermined number of times or more in a predetermined time period being a condition, information characterizing the type of this dark determination (an address of a country corresponding to the address determined to be dark, a port number indicating a service, an application, or the like) may be extracted, and partial information may be collected by updating to the collection rule making the collection rate of this information higher. Thereafter, if dark determination is not output as the result in the same or a different predetermined time period, the updated collection rule may be returned to the original collection rule. Further, the analysis result and the analyzed result may be applied in combination with each other to update the collection rule.

Further, based on the model information of the analysis device 22 and/or the determination result by the analyzing device 24, in machine learning generally, analysis and learning are often processed based on fixed feature vectors. Therefore, since update of a collection rule involving addition, deletion, or change of an element forming a feature vector is not consistent with model information, which is the learned result so far, the learning may not function well. However, this is not the case if a learning algorithm that allows an element forming a feature vector to be dynamically added, deleted, or changed is applied.

Figure 17:
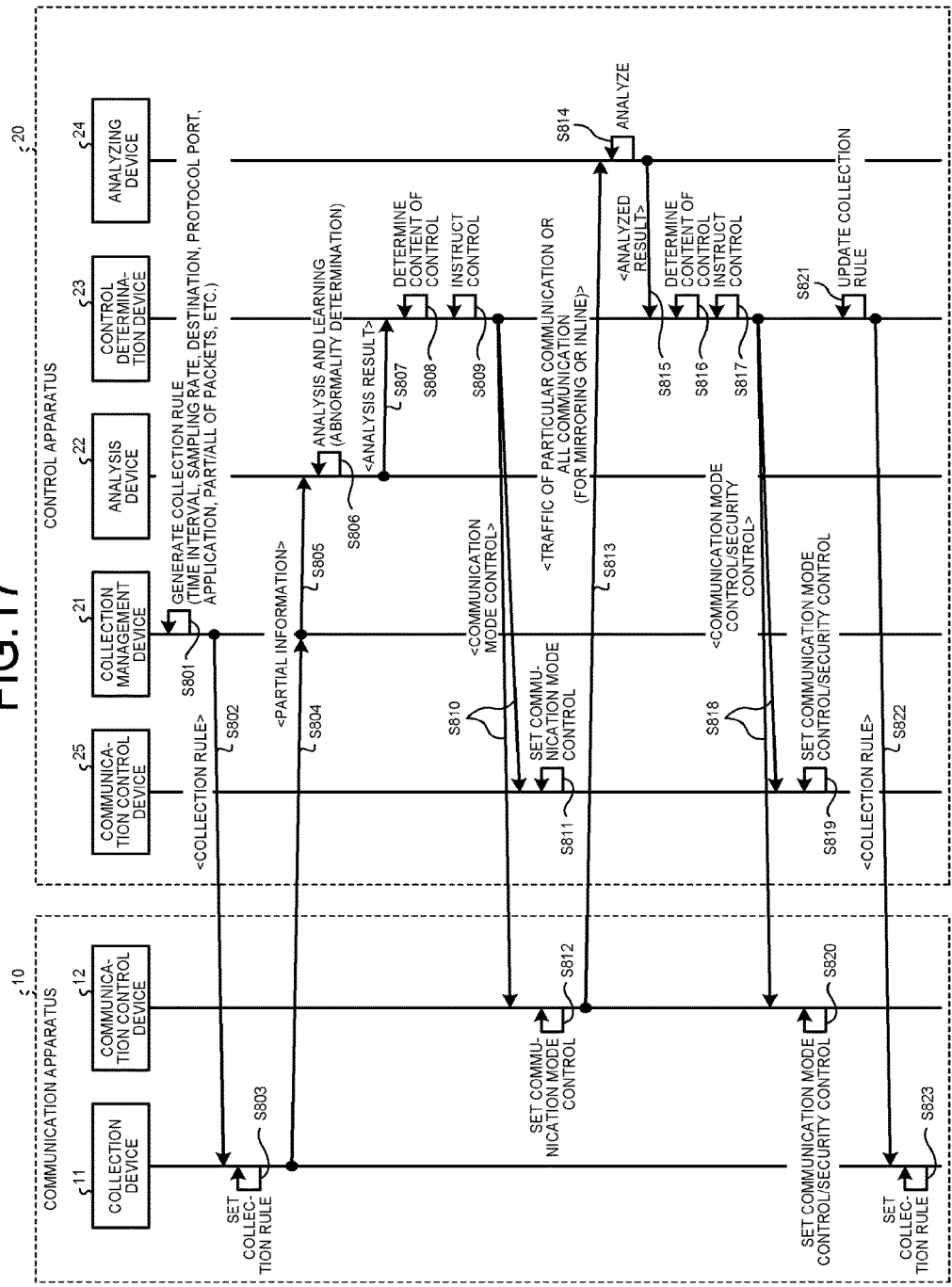
FIG. 17 is a sequence diagram illustrating a flow of the communication control processing in the network system according to the third embodiment.

Next, by use of FIG. 17, a flow of communication control processing in the network system 100 according to the third embodiment will be described. FIG. 17 is a sequence diagram illustrating the flow of the communication control processing in the network system according to the third embodiment. The processing of Step S804 to Step S820 in FIG. 17 is similar to that of Step S101 to Step S117 of the communication control processing in the network system 100 according to the first embodiment described with respect to FIG. 6, and thus description thereof will be omitted.

As illustrated in FIG. 17, firstly, the collection management device 21 generates a collection rule (Step S801), and transmits the collection rule to the collection device 11 (Step S802). The collection device 11 sets the collection rule (Step S803), and based on the set collection rule, transmits the partial information to the collection management device 21 (Step S804).

Thereafter, after each of the communication control devices 12 and 25 sets the notified communication mode or security control (Steps S819 and S820), the control determination device 23 updates the collection rule (Step S821), and transmits the collection rule to the collection device 11 (Step S822). The collection device 11 then sets the updated collection rule (Step S823).

Figure 18:
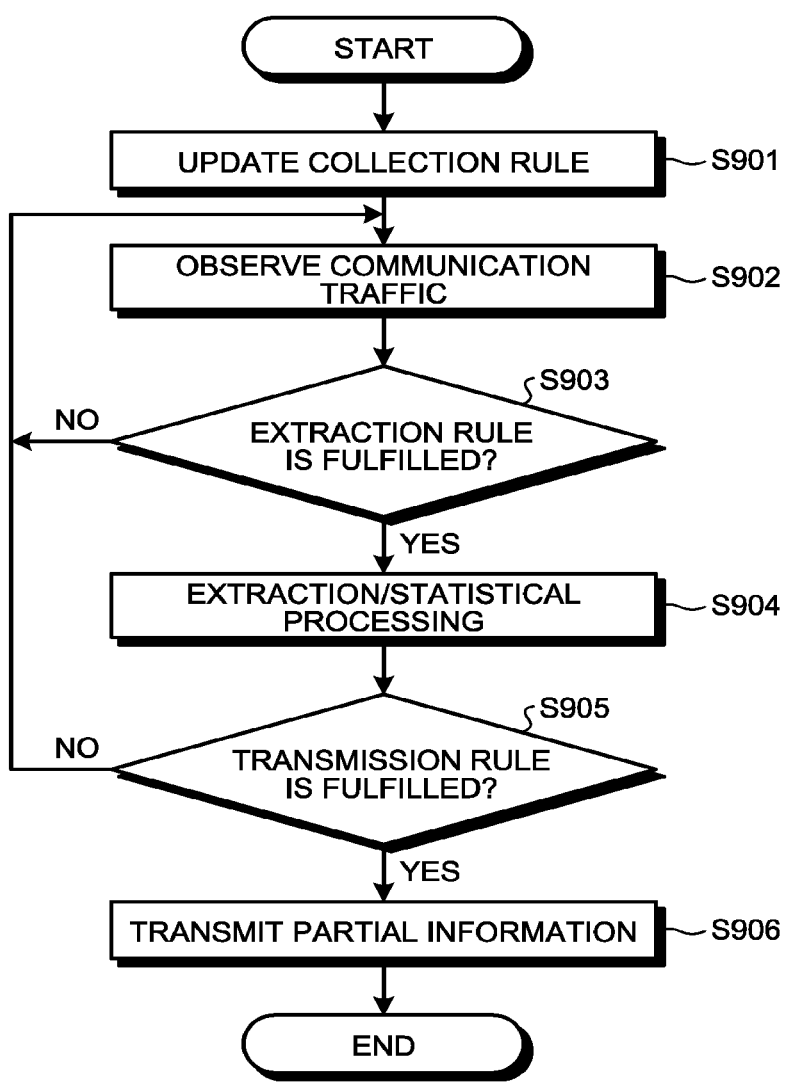
FIG. 18 is a flow chart illustrating a flow of collection processing in a collection device according to the third embodiment.

Next, by use of FIG. 18, a flow of collection processing in the collection device 11 will be described. FIG. 18 is a flow chart illustrating the flow of the collection processing in the collection device according to the third embodiment.

As illustrated in FIG. 18, the collection device 11 updates the collection rule, when the updated collection rule is received from the control determination device 23 (Step S901). The collection device 11 observes the communication traffic (Step S902), and determines whether the communication traffic fulfills the updated extraction rule (Step S903). As a result, if the extraction rule is fulfilled (Step S903; Yes), information related to the communication is extracted or statistically processed (Step S904). Thereafter, by processing similar to that of the collection device 11 according to the first embodiment, the partial information is transmitted to the collection management device 21 (Step S906).

As described above, in the network system according to the third embodiment, in order to make determination more accurately, by the control determination device 23 dynamically updating the collection rule, the partial information to be collected is able to be collected appropriately.

Fourth Embodiment

In the above described first embodiment, determination is made based on the analysis result and/or analyzed result of the single user NW 30, but model information that is results of analysis in respective user NWs 30 may be integrated or shared. Thereby, model information is able to be formed of many more and more various feature vector groups and generally, accuracy of abnormality detection is expected to be improved. In this case, the analysis device 22 is configured to subject the feature vectors of the respective user NWs 30 to one means of machine learning, and to form one set of model information.

In a fourth embodiment, a case where model information that is results of analysis of the respective user NWs 30 is integrated, and the analysis device 22 shares the model information for each user will be described as an example. Description of processing similar to that of the first embodiment will be omitted.

Figure 19:
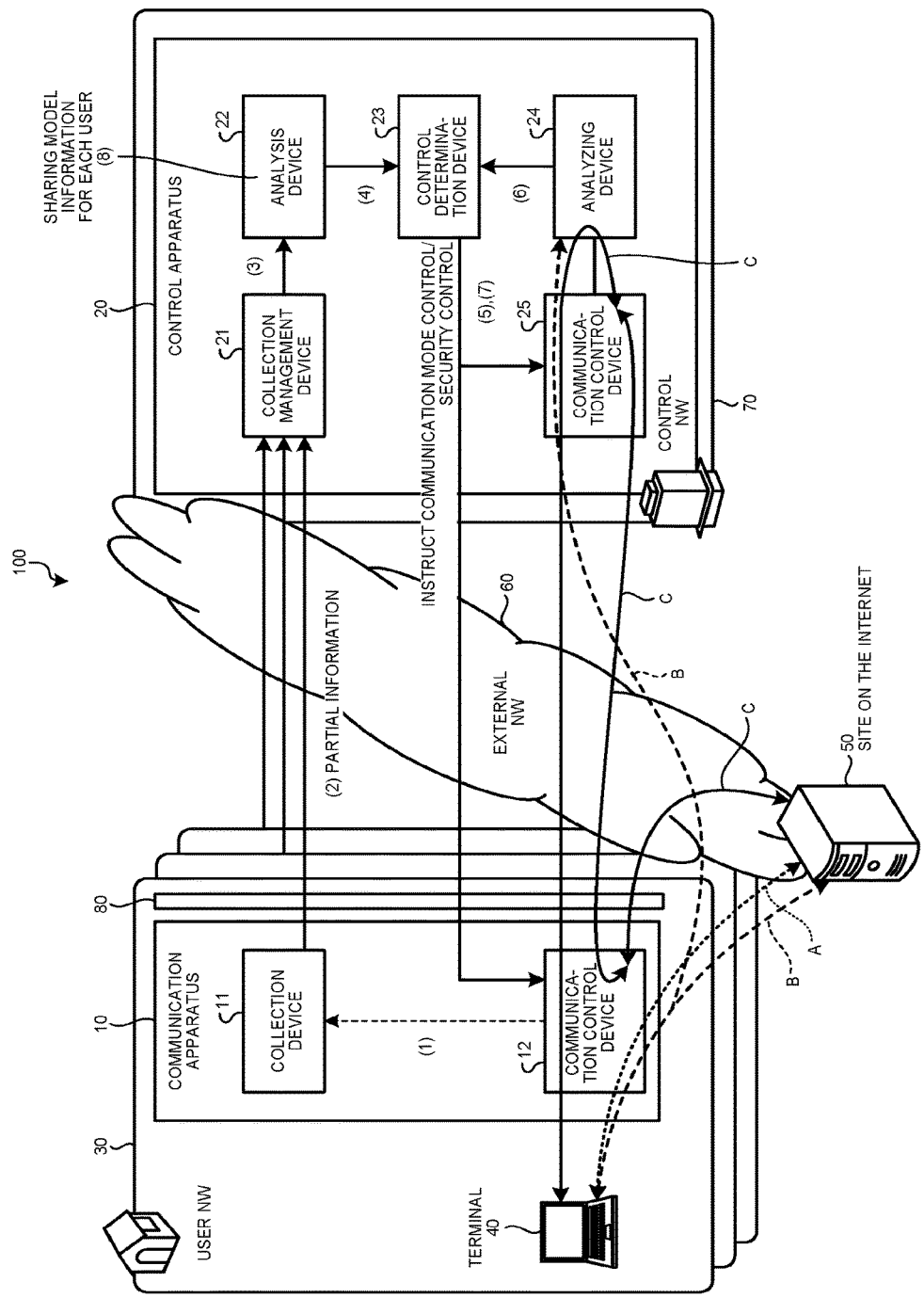
FIG. 19 is a diagram illustrating a sequential flow of communication control processing by a network system according to a fourth embodiment.

FIG. 19 is a diagram illustrating a sequential flow of communication control processing in a network system according to the fourth embodiment. As illustrated in FIG. 19, the analysis device 22 subjects feature vectors of the respective user NWs 30 to one means of machine learning to form one set of model information, and shares the model information for each user (see (8) in FIG. 19).

Further, instead of sharing the model information evenly, the model information that is results of analysis of the respective user NWs 30 may be clustered, and only model information of user NWs 30 with similar model information may be shared. Instead of achieving diversification by simple integration of the original model information, by the sharing between model information corresponding to user NWs 30 having model information similar to the original model information, that is, having similar communication behaviors, model information following the trend of the communication of the user NW 30 is able to be formed. By sharing model information between user NWs 30 having similar features of trends or behaviors of local communication of the respective user NWs 30, information for learning is able to be increased while making use of these features, and accuracy of abnormality detection is expected to be improved.

In this case, the analysis device 22 stores the model information in association with each user NW 30 in the storage unit 22b. Further, at a predetermined moment, similarities between sets of model information are calculated, and sets of model information determined to be similar are integrated and shared. In this case, in addition to storage of model information for each user NW 30, the integrated model information may be stored.

Methods of finding similarities between sets, the methods used upon determination of similarities between sets of model information, include, for example, calculation exemplified by FIG. 20. The analysis device 22 finds, as a calculated coefficient, "sim", a Jaccard coefficient, a Dice coefficient, or a Simpson coefficient, and if the calculated coefficient "sim" is equal to or larger than a predetermined threshold, the analysis device 22 determines the sets of model information to be similar. The three coefficients, the Jaccard coefficient, the Dice coefficient, and the Simpson coefficient, may be found to determine the similarity, or one or two of the coefficients may be found to determine the similarity.

Further, by performing trend analysis between learning models of the user NWs 30 or between learning models of clusters, or abnormality determination in units of model information, while holding the learning models of the respective user NWs 30 or the learning models of the respective clusters; not only abnormality determination of feature vectors in the model information, but also determination of abnormality in the model information itself is enabled, and thus a result of this determination may be applied as an analysis result. In this case, even for a feature vector group not abnormal in a certain set of model information, by being compared to another set of model information, the certain set of model information itself may be detected as a set in which abnormal feature vectors get a majority.

Fifth Embodiment

In the above described first embodiment, the case where whether to make transition to the mirroring mode or to make transition to the inline mode is controlled according to the degree of abnormality in the communication has been described, but the present invention is not limited to this case. For example, each of the communication control devices 12 and 25 may be controlled such that transition to the inline mode is made if the communication detected to be abnormal by the analysis device 22 is encrypted communication, and transition to the mirroring mode is made if the communication is plain text communication.

That is, when the communication detected to be abnormal by the analysis device 22 is encrypted communication, even if transition to the mirroring mode is made and the communication is brought into the analyzing device 24, since the communication is encrypted, the analyzing device 24 is unable to perform deep analysis by deep packet inspection (DPI).

Therefore, in a fifth embodiment, a case will be described as an example, the case where each of the communication control devices 12 and 25 is controlled such that if communication detected to be abnormal by the analysis device 22 is encrypted communication, transition to the inline mode is made, and if the communication is plain text communication, transition to the mirroring mode is made. Further, an example of the network system according to the fifth embodiment will be described, the example newly having an encrypted communication inspection device 26, which decrypts encrypted communication received from the terminal 40, transmits the decrypted communication to the analyzing device 24, and encrypts the decrypted communication again and transmits the encrypted communication to a destination. Description of processing similar to that of the first embodiment will be omitted.

The control determination device 23 may use a transmission source or destination port number of a packet, for example, for discrimination between encrypted communication and plain text communication. For example, in hypertext transfer protocol secure (HTTPS) communication, for a port with a destination port number, "443" (http protocol over TLS/SSL (https): 443); or in file transfer protocol over SSL/TLS (FTPS) communication, for a port with a port number "989" (FTP data transfer port) or a port with a port number "990" (FTP control port): the communication is determined to be encrypted.

When there is encrypted communication that is unable to be decrypted by the encrypted communication inspection device 26, if the fact that the encrypted communication is unable to be decrypted is known, transition to the mirroring mode may be made. For identification of this encrypted communication known to be unable to be decrypted, the port number is also used. Further, if the fact that VPN communication is to be performed with a particular destination is known in advance, identification may be performed by use of the destination IP address. Furthermore, information on the port number or the IP address is stored, for example, in the storage unit 23c in the control determination device 23.

Figure 21:
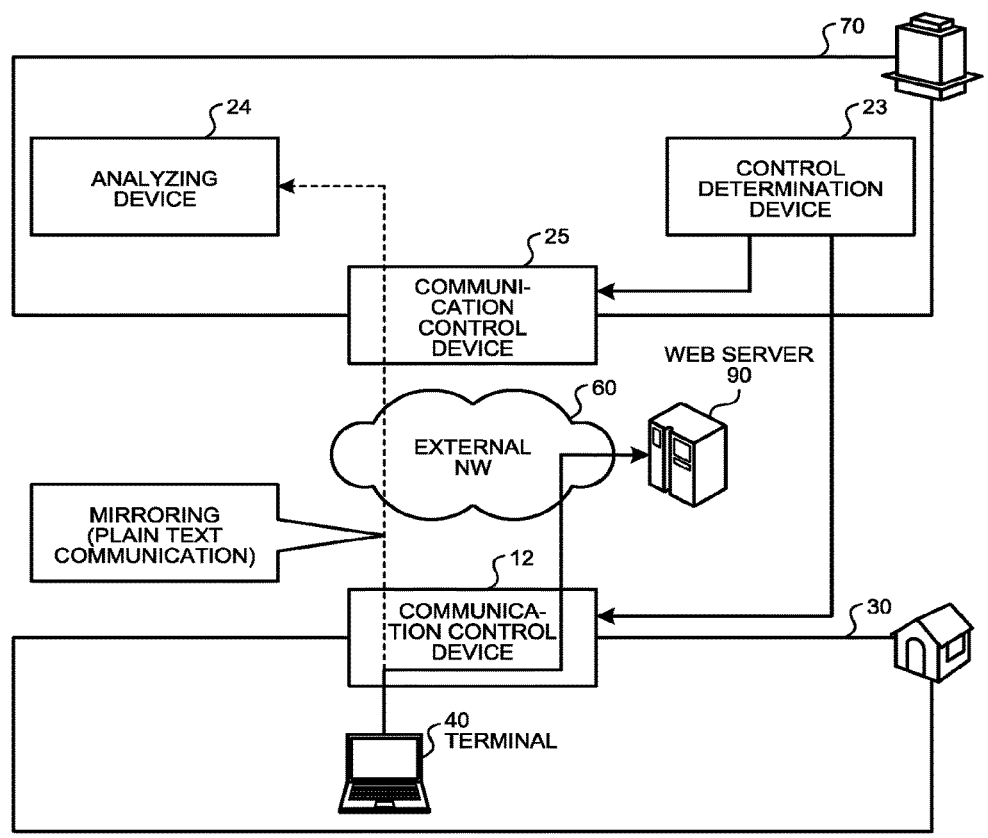
FIG. 21 is a diagram illustrating a sequential flow of communication control processing in a mirroring mode in a network system according to a fifth embodiment.

For example, as exemplified by FIG. 21, if the control determination device 23 determines that the communication detected to be abnormal by the analysis device is plain text communication, the control determination device 23 causes transition to the mirroring mode. After the transition to the mirroring mode, similarly to the first embodiment, the communication control device 25 transfers the received communication to the analyzing device 24.

Figure 22:
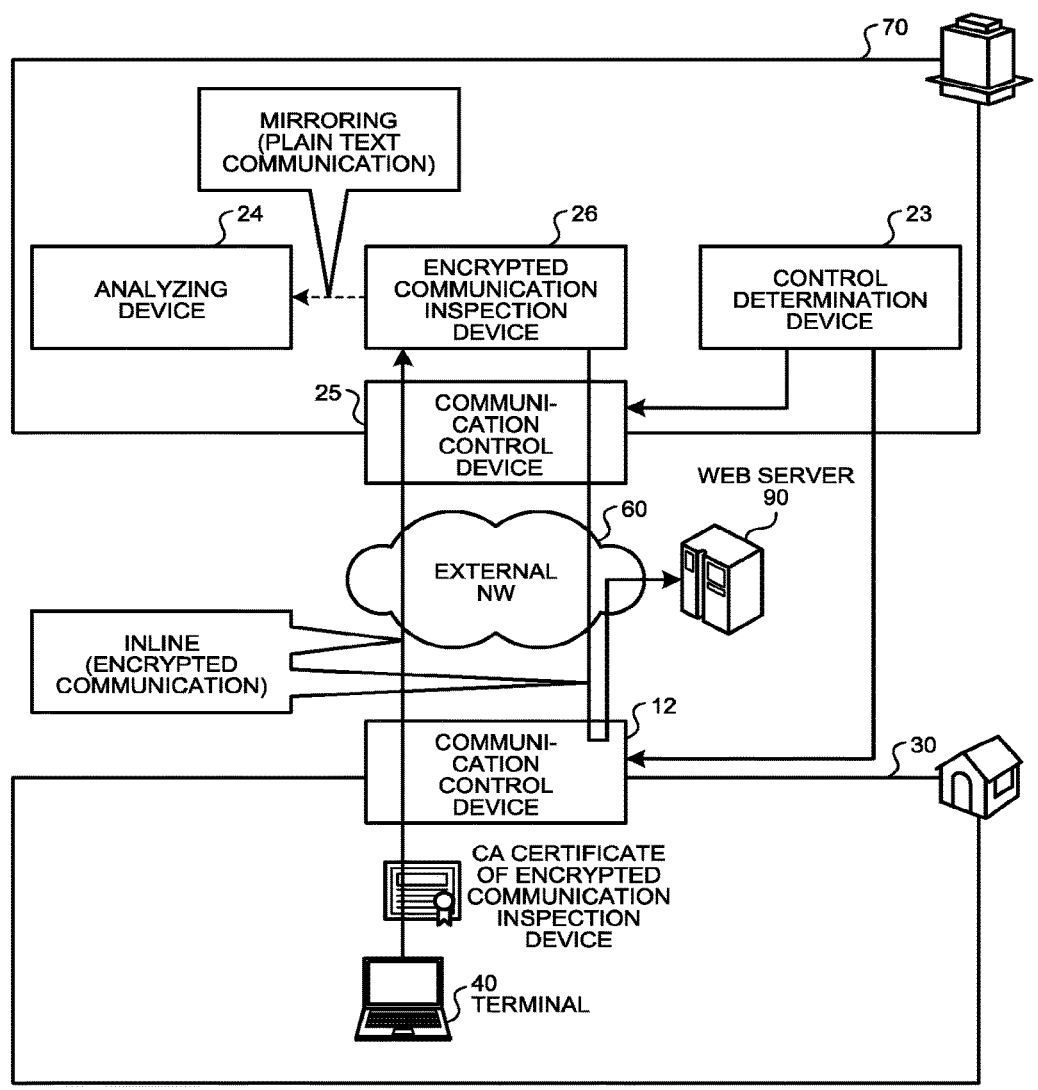
FIG. 22 is a diagram illustrating a sequential flow of communication control processing in an inline mode in the network system according to the fifth embodiment.

Further, as exemplified by FIG. 22, if the control determination device 23 determines that the communication detected to be abnormal by the analysis device is encrypted communication, the control determination device 23 causes transition to the inline mode. Generally, it is assumed that a certificate authority (CA) certificate of the encrypted communication inspection device 26 has been imported in the terminal 40 in the user NW 30.

In the inline mode, the encrypted communication inspection device 26 establishes a session of encrypted communication, such as of SSL/TLS, to each of the terminal 40 and a Web server 90. The encrypted communication inspection device 26 decrypts the received encrypted communication, transmits the decrypted communication to the analyzing device 24, encrypts the communication again, and transmits the encrypted communication to the Web server 90, which is the destination. The encrypted communication inspection device 26 is a device generally called, an SSL inspection device, or the like. The encrypted communication inspection device 26 and the analyzing device 24 may be formed of the same device.

As described above, in the fifth embodiment, since each of the communication control devices 12 and 25 is controlled such that if communication detected to be abnormal by the analysis device 22 is encrypted communication, transition to the inline mode is caused, and if the communication is plain text communication, transition to the mirroring mode is caused; even if the communication detected to be abnormal is encrypted communication, the communication is able to be analyzed by the analyzing device 24.

Sixth Embodiment

In the above described first embodiment, the case has been described, where when in the normal mode, partial information related to communication flowing in the communication control device 12 at the user NW 30 side is collected, analyzed, and detected to be abnormal, transition of that communication to the mirroring mode or inline mode is caused, but the present invention is not limited to this case. For example, information detected in the past as abnormal communication by the analysis device 22 may be accumulated, and by use of the accumulated information, control of causing transition to the mirroring mode or inline mode with respect to a packet appearing for the first time may be performed.

For example, if it is based on the specifications of OpenFlow, for an unregistered packet not corresponding to the flow table of the OpenFlow compatible switch, predetermined partial information of this packet is able to be transferred to the OpenFlow controller. At the OpenFlow controller side, processing of this packet is determined, and a flow entry is able to be set in the flow table of the OpenFlow compatible switch so that this processing is followed. With such specifications of OpenFlow, for the packet transferred to the OpenFlow controller, control of causing transition to the mirroring mode or inline mode or control of blocking the corresponding communication may be performed, by use of information detected in the past as abnormal communication by the analysis device 22.

In a sixth embodiment below, a case will be described, the case where, with the specifications of OpenFlow, for a packet transferred to the OpenFlow controller, control of causing transition to the mirroring mode or inline mode is performed by use of information detected in the past as abnormal communication by the analysis device 22. Description of processing similar to that of the first embodiment will be omitted.

Figure 23:
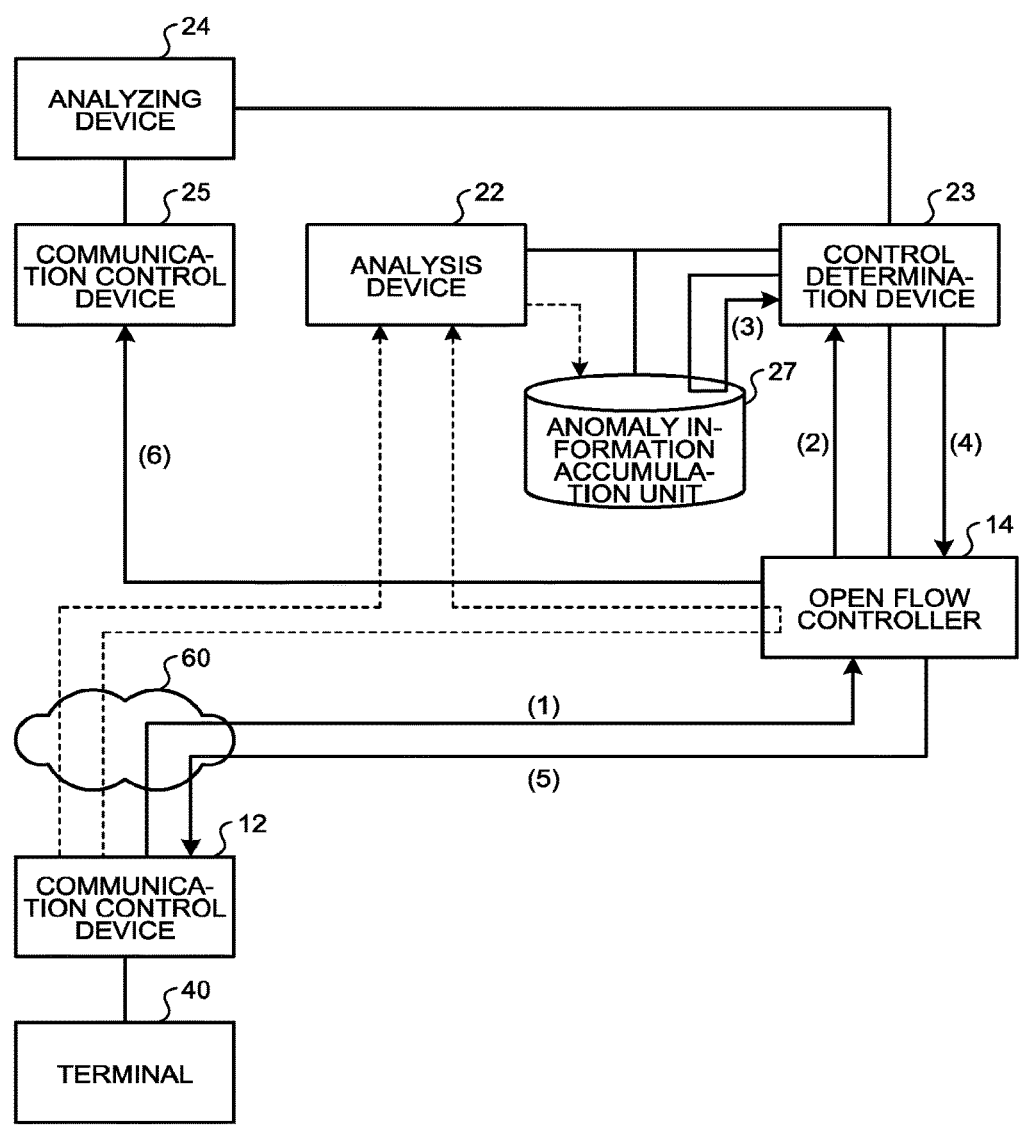
FIG. 23 is a diagram illustrating a sequential flow of communication control processing in a network system according to a sixth embodiment.

By use of FIG. 23, an example of a network system according to the sixth embodiment will be described. FIG. 23 is a diagram illustrating a sequential flow of communication control processing in the network system according to the sixth embodiment. As illustrated in FIG. 23, the network system according to the sixth embodiment is different from the first embodiment in that the network system further has an anomaly information accumulation unit 27. The anomaly information accumulation unit 27 accumulates, based on results analyzed by the analysis device 22, information representing abnormal communication (hereinafter, referred to as "anomaly information", as appropriate).

Further, if the control determination device 23 receives a packet from the communication control device 12 including the OpenFlow compatible switch function via an OpenFlow controller 14, the control determination device 23 determines whether or not information included in the packet matches anomaly information accumulated in the anomaly information accumulation unit 27; and if it is determined to be abnormal, by performing control of causing transition to the mirroring mode or inline mode with respect to the communication control device 12 or the communication control devices 12 and 25, the control determination device 23 controls the communication control device 12 such that the communication is transferred from the communication control device 12 to the analyzing device 24. The communication control device 25 also includes an OpenFlow compatible switch function.

The anomaly information will now be described specifically. The anomaly information accumulation unit 27 stores therein, for example, as exemplified by FIG. 24: "5f-tuple information" including an "ID" identifying each entry, a protocol number, a transmission source IP address, a destination IP address, a transmission source port number, and a destination port number; and a "content of control", which is a content of control when the 5-tuple information is fulfilled, in association with each other. Describing specifically with respect to FIG. 24, the anomaly information accumulation unit 27 stores therein, for example, the ID, "1", the protocol number, "6 (TCP)", the transmission source IP address, "A.B.C.D", the destination IP address, "E.F.G.H", the transmission source port number, "10000", the destination port number, "80", and the content of control, "mirroring mode", in association with one another. The 5-tuple information may be information specifying a range, such as a range of IP addresses.

In the example of FIG. 24, for the IDs, "1" and "2", information is stored for each of the protocol numbers, transmission source IP addresses, destination IP addresses, transmission source port numbers, and destination port numbers, and this means that information on both directions of communication has been stored. Further, for the ID, "1" or "2", when all of the 5-tuple items match information of all of 5-tuple items of a packet to be processed, the packet is regarded as "corresponding" to abnormal communication.

Further, for the ID, "3" or "5", when the three, the protocol number, the destination IP address, and the destination port number, match information of a packet to be processed, the packet is regarded as "corresponding" to abnormal communication. Further, for the ID, "4" or "6", when the two, the protocol number and the destination IP address, match information on a packet to be processed, the packet is regarded as "corresponding" to abnormal communication. For the IDs, "3" to "6", similarly to the IDs, "1" and "2", information on both directions may be stored.

The communication control device 12 performs transfer processing of packets according to rules called flow entries. In the flow entries, rule information of packet processing related to how to process what kinds of packets is stored. For example, in flow entries that the communication control device 12 has, as exemplified by FIG. 25, an "ID" identifying a flow entry, "matching conditions" that are conditions for determining whether or not a received packet is matched, an "action" that is processing performed when the packet matches the matching conditions, and "counters" that are statistical information related to the packet, are stored in association with one another. The table in FIG. 25 is called a flow table, and each line in the flow table is called a flow entry. The statistical information includes the number of packets, the number of bytes, a duration from registration of the flow entry, and the like.

In the matching conditions, all of the 5-tuple items may be set, or only any one or more of the items may be set. Further, in the matching conditions, items, such as an input port of the OpenFlow compatible switch, the input port where the packet has been input, and packet header information other than the 5-tuple information may be set. Further, as the action, mainly: an output destination port of the packet that has matched the matching conditions; processing, such as discarding the matching packet or rewriting a specified feed in a header of the matching packet; and the like, are set. The statistical information in a flow entry is transmitted to the analysis device 22 as partial information from the communication control device 12 having the OpenFlow compatible function via the OpenFlow controller 14, and partial information other than the statistical information is transmitted to the analysis device 22 via the collection management device 21 or the communication control device 25.

Returning to the description of FIG. 23, the sequential flow of the communication control processing in the network system according to the sixth embodiment will be described. As illustrated in FIG. 23, if a received packet is unregistered, without any rule information corresponding thereto in the flow table (or if a predetermined packet has been specified in advance), the communication control device 12 notifies the OpenFlow controller 14 of a notification message (Packet In message) (see (1) in FIG. 23). The Packet In message is a message that transmits the received packet to the OpenFlow controller 14 when there is no matching flow in the flow table.

The OpenFlow controller 14 notifies the control determination device 23 of the 5-tuple information of the corresponding packet included in the notification message (see (2) in FIG. 23). Subsequently, the control determination device 23 refers to anomaly information in the anomaly information accumulation unit 27 to collate the received notification with the anomaly information (see (3) in FIG. 23).

If the 5-tuple information corresponds to the anomaly information, the control determination device 23 transmits a control instruction to execute corresponding control (mirror mode, inline mode, or security control) to the OpenFlow controller 14, and if the 5-tuple information does not correspond to the anomaly information, transmits a control instruction to execute control of the normal mode to the OpenFlow controller 14 (see (4) in FIG. 23).

The OpenFlow controller 14 notifies the communication control device 12 at the user NW 30 side or the communication control device 25, which has received the notification message (Packet In message), of a message (Flow Mod message) setting a flow entry (see (5) in FIG. 23). When the communication control device 12 or the communication control device 25 receives the message (Flow Mod message), the communication control device 12 or the communication control device 25 updates the flow entry/flow table of the communication control device 12 or the communication control device 25. Further, the OpenFlow controller 14 notifies the communication control device 12, which has transmitted the notification message, of a packet processing message (Packet Out message). The communication control device 12 performs processing according to the packet processing message (Packet Out message).

Thereafter, if the communication control device 12 receives a packet corresponding to the updated flow table, the communication control device 12 performs packet processing according to the rule information in the flow table without notifying the OpenFlow controller 14. The Packet Out message is a message used when a packet transmitted to the OpenFlow controller 14 with the Packet In is transmitted back to the communication control device 12 side in order to transmit (or drop, for example) the packet to a predetermined destination.

Further, as necessary, the OpenFlow controller 14 notifies the communication control device 25 at the control NW 70 side, of a message (Flow Mod message: addition, update, or deletion of the flow entry) setting a flow entry corresponding to the corresponding control (mirror mode, inline mode, or security control) (see (6) in FIG. 23). If control (mirror mode or inline mode) is statically set in the flow table of the communication control device 25 at the control NW 70 side, this notification is unnecessary, but if control (mirror mode or inline mode) is set dynamically, this notification is performed, together with notification to the communication control device 12.

The configuration of the network system in FIG. 23 is an example, the configuration is not limited to this example, and for example, the anomaly information accumulation unit 27 may be included in the control determination device 23, the OpenFlow controller 14 may be included in the control determination device 23, or both the anomaly information accumulation unit 27 and the OpenFlow controller 14 may be included in the control determination device 23.

As described above, in the sixth embodiment, by causing information detected as abnormal communication in the past by the analysis device 22 to be accumulated, and performing control of causing transition to the mirroring mode or inline mode by use of the accumulated information, even for a packet appearing for the first time, control of causing transition to the mirroring mode or inline mode is able to be performed appropriately.

The inventions according to the above described embodiments may be applied in any combination with one another. Further, in the first embodiment to the fifth embodiment also, similarly to the sixth embodiment, anomaly information indicating anomaly that is an analysis result may be accumulated, and by use of this accumulated anomaly information, the control determination device 23 may control communication by notifying the communication control device 12 or 25 of settings. In this case, the control determination device 23 may collect information (such as 5-tuple information) related to communication currently valid (communication registered in a flow table of the OpenFlow compatible switch) from the communication control device 12 regularly or at each predetermined moment, and if there is communication corresponding to the anomaly information, this communication may be made a target of control. Further, the flow table of the OpenFlow compatible switch corresponds to, for example, the storage unit 12a of the communication control device 12, or the storage unit 25b of the communication control device 25.

The present invention has been described by use of some embodiments, but technical scope of the present invention is not limited to the scope described in the above described embodiments. It is evident to those skilled in the art that the above described embodiments may be variously modified or improved. Further, it is evident from the statement of the claims that any mode modified or improved as such may be included in the technical scope of the present invention.

[Security Control]

For example, in the above described embodiments, the communication control device 12 performs filtering of packets, but a terminal performing the communication may be connected to an inspection NW not illustrated, security check inside the terminal may be implemented, and malware removal or security update may be forced as necessary.

Security control in the normal mode or mirroring mode is executed by the communication control device 12 of the communication apparatus 10 by transmission of a control instruction to this communication control device 12. On the contrary, in the inline mode, if the communication is determined to be malicious communication or suspicious communication, the analyzing device 24 may block the communication first, and thereafter, a control instruction causing security control to be reflected may be transmitted to the communication control device 12 of the communication apparatus 10. In this case, a time lag from the determination to the blockage is eliminated. Or, if security control is executed by the communication control device 12 of the communication apparatus 10, it may be handled similarly to the normal mode or mirroring mode. Further, security control in a case where communication in a certain user NW 30 is determined to be dark as an analyzed result may be applied to another user NW 30, rather than only to that certain user NW 30. The communication control device 12 or 25 has been described as the target of security control by the control determination device 23, but at least the communication control device 12 only may be targeted. The position of the analyzing device 24 in the inline mode is arranged in a form where the analyzing device 24 is in-line connected between the terminal 40 and the site 50 on the Internet, and thus communication traffic received by the analyzing device 24 is transmitted transparently as is (if the analyzing device 24 determines the communication traffic to be malicious communication, the analyzing device 24 itself may block that communication), but in the mirroring mode, since the analyzing device 24 receives communication traffic that has been mirroring-copied, after being analyzed, the communication traffic is discarded.

[Transition of Communication Mode]

As to transition of the communication mode, a configuration may be adopted, in which transition among the three modes, the normal mode, the mirroring mode, and the inline mode, is made, or a configuration may be adopted, in which transition between two modes, the normal mode and the mirroring mode, or the normal mode and the inline mode, is made. If transition among the three modes is made: a configuration may be adopted, in which transition from an arbitrary mode to another arbitrary mode is made; a configuration may be adopted, in which transition from the inline mode to the mirroring mode is excluded from this configuration of arbitrary transition; or a configuration may be adopted, in which transition from the normal mode to the inline mode, or transition from the inline mode to the mirroring mode is excluded from that configuration of arbitrary transition. Solid lines and broken lines in FIG. 4 are an example indicating change of transition, and the transition with the broken lines may be omitted. Or, a configuration combining these may be adopted.

Further, after the security control instruction, the communication mode may be immediately returned to the normal mode after the communication corresponding to the instruction is blocked. Or, after the communication is blocked, the inline mode (or mirroring) may be continued, and if clean determination continues for a predetermined time period, or dark or gray determination is not output for a predetermined time period in or from the analyzing device 24, the communication mode may be returned to the normal mode. Further, each of communication related to the partial information and the collection rule between the collection device 11 and the collection management device 21, and communication between the communication control devices 12 and 25 may be encrypted.

[Generation of Feature Vector]

In the above described embodiments, the case where the collection device 11 generates a feature vector and transmits the feature vector to the collection management device 21 has been described, but the present invention is not limited to this case. For example, the collection device 11 may transmit information necessary for feature vectorization to the collection management device 21, and the collection management device that has received this information may perform feature vectorization thereof and transfer the feature vectorized information to the analysis device.

[Mirroring Mode and Inline Mode]

All of communication traffic going through the communication apparatus 10 may be made a target of communication control of these communication modes, but by regarding communication between terminals in the user NW 30 as safe, only communication between the internal NW and the external NW may be made a target of the communication mode control. Further, only communication with a particular destination and/or a transmission source, or communication of a particular protocol, service, or application may be made a target of communication mode control. Communication traffic out of the target in this case is communicated between the transmission source and the destination via the communication apparatus 10, similarly to the normal mode. The target is determined, based on the content of a control instruction from the control determination device 23. As to communication to be collected, only communication between the internal NW and the external NW may be made a target of collection, and a rule for collecting only the communication between the internal NW and the external NW may be described in the collection rule.

With respect to setting the control of the three communication modes, control in a case, where an OpenFlow controller is arranged in the control determination device 23, and OpenFlow compatible switches are arranged in the communication control devices 12 and 25, will be described.

In the normal mode, which is basic, the communication control device 12 realizes general switching functions. In the normal mode, the communication control device 25 does not operate in particular. In the mirroring mode, by an instruction from the OpenFlow controller, a flow entry is written into the storage unit 12a of the communication control device 12, the flow entry for controlling such that communication traffic received from the communication interface communicating with the internal NW or the communication interface communicating with the external NW is transferred to the destination, and is also transferred to the opposite side of the tunnel (the communication control device 25 side). In the storage unit 25b of the communication control device 25, a flow entry is written, the flow entry for controlling such that the communication traffic received from the opposite side of the tunnel (the communication control device 12 side) is transferred to the analyzing device 24 side.

In the inline mode, in the storage unit 12a of the communication control device 12, a flow entry is written, the flow entry for controlling such that communication traffic received by the communication interface communicating with the internal NW or the communication traffic received by the communication interface communicating with the external NW (not the communication traffic from the opposite side of the tunnel) is transferred to the opposite side of the tunnel (the communication control device 25 side), and the communication traffic received from the opposite side of the tunnel (the communication control device 25 side) is transferred to the destination of the communication traffic. In the storage unit 25b of the communication control device 25, a flow entry is written, the flow entry for controlling such that the communication traffic received from the opposite side of the tunnel (the communication control device 12 side) is transferred to the analyzing device 24 side and the communication traffic returned from the analyzing device 24 is transferred to the opposite side of the tunnel (the communication control device 12 side).

Flow entries are control rules received from the OpenFlow controller and are configured to include matching rules and actions, and if input communication traffic fulfills the conditions set in the matching rules, control set in the action corresponding to these matching rules is executed for this communication traffic. For example, in the matching rules, a set of one or more of pieces of information including the port of the OpenFlow compatible switch to which the packet has been input, and the MAC addresses, the IP addresses, and the port numbers of the transmission source and the destination of the packet, which are mainly pieces of information from the layer 1 to the layer 4, may be described as conditions. Further, in the action, an operation, such as transferring a packet fulfilling the matching rules to a specified output destination port, or dropping the fulfilling packet without transferring it, may be specified.

In the mirroring mode or the inline mode, all of communication traffic may be made a target of control, but only communication traffic with a particular destination, transmission source, or service (port number) may be made a target of control. By performing setting in flow entries, individual control is possible. In this case, communication traffic other than these targets of individual control is controlled in the normal mode.

Instead of rewriting and changing the destination address or the like of a packet of communication traffic, control of transfer is desirably enabled by specification of a transfer destination port. This is because rewriting a packet may hinder the packet from being appropriately analyzed. Therefore, for example, a port for tunneling or a communication interface is desirably prepared for tunnel construction.

When the communication mode is changed, the OpenFlow controller instructs each of the OpenFlow compatible switches to write a flow entry corresponding to the communication mode desired to be controlled.

If the OpenFlow controller is configured to be arranged in each of the communication control devices, instead of in the control determination device 23, the control determination device 23 instructs each of the OpenFlow controllers to perform such control. Each of the OpenFlow controllers writes a flow entry for an OpenFlow compatible switch in the same device.

In security control, based on destination and transmission source IP addresses, port numbers, and the like of communication determined to be restricted as an analyzed result, this communication is blocked, and thus by use of these pieces of information, setting of filtering is performed. When the specifications of OpenFlow are used, by writing a flow entry corresponding to this setting for the OpenFlow compatible switch from the OpenFlow controller, the OpenFlow compatible switch executes filtering.

Further, in the above described embodiments, the communication mode to be applied is determined based on machine learning, such as abnormality detection or clustering, but not being limited thereto, a configuration may be adopted, in which the communication mode is changed if communication is analyzed, based on partial information, to be communication satisfying a predetermined condition. For example, this predetermined condition may be described as a rule, stored in the storage unit 22b of the analysis device 22, the analysis/learning unit 22a may collate this rule with input partial information to output an analysis result, and the control determination device 23 may determine the communication mode, based on this analysis result. As to an explicit rule, for example, in a case where partial information indicating communication with a URL, an FQDN, a domain, an IP address, an IP address range, a country, or a region, which has often been abused recently in cyber attacks, is received, since this case matches this rule, the normal mode may be changed to the mirroring mode, or to the inline mode. Further, these may also be treated as abnormal. When clustering is applied to machine learning, input information classified into a particular cluster may be treated as abnormal.

[Partial Information and the Like]

The partial information may be partial communication from communication traffic flowing in the communication apparatus at the user NW 30 side. For example, in combination with the 5-tuple, the partial information may be statistical information, such as a start time, an end time, the total number of packets flown between the start time and the end time, and the total data size, of the corresponding communication. Further, for example, in communication between terminals A and B, statistical information may be calculated for each direction of the communication (from A to B and from B to A). This information is information collectible with the specifications of OpenFlow.

Further, the partial information may be particular communication itself, of communication transmitted and received by the terminal. For example, communication of a DNS or the like may be always mirrored to the collection management device or the analysis device. In this case, a name to be resolved from a request packet and a response packet, and information including a resolved IP address are stored in association with each other. Or, a feature vector may be formed, or the name and the IP address may be made a target of analysis or machine learning.

Further, partial information may be a combination of the above mentioned partial communication from communication traffic flowing in the communication apparatus at the user NW 30 side, and a particular communication itself. Further, the description has been made based on OpenFlow, but not being limited thereto, any substitutable software defined networking (SDN) technique or any technique having functions that are able to realize the present invention may substitute for this.

[Device Configuration and the Like]

Respective functions (devices) included in the communication apparatus 10 and the control apparatus 20 may be physically or virtually distributed, and upon the distribution, each of functions (devices) in both of these apparatuses may be distributed as one unit. Further, for example, the collection management device 21 is omittable, the collection unit 21a may be incorporated into the analysis device 22, and the extraction control unit 21b may be incorporated into the control determination device 23. Furthermore, each unit in each device may be configured to be incorporated in any of the other devices as long as the unit functions effectively.

[Program]

Programs, which describe the processing executed by the communication apparatus 10 and the control apparatus 20 according to the above described embodiments in a language executable by a computer, may be generated. In this case, by the computer executing the programs, the same effects as those of the above described embodiments are able to be obtained. Further, by recording such a program in a computer readable recording medium and causing the computer to load and execute the program recorded in this recording medium, the same processing as that of any of the above described embodiments may be realized. Hereinafter, an example of a computer that executes a communication control program realizing the same functions as those of the communication apparatus 10 and the control apparatus 20 will be described.

Figure 26:
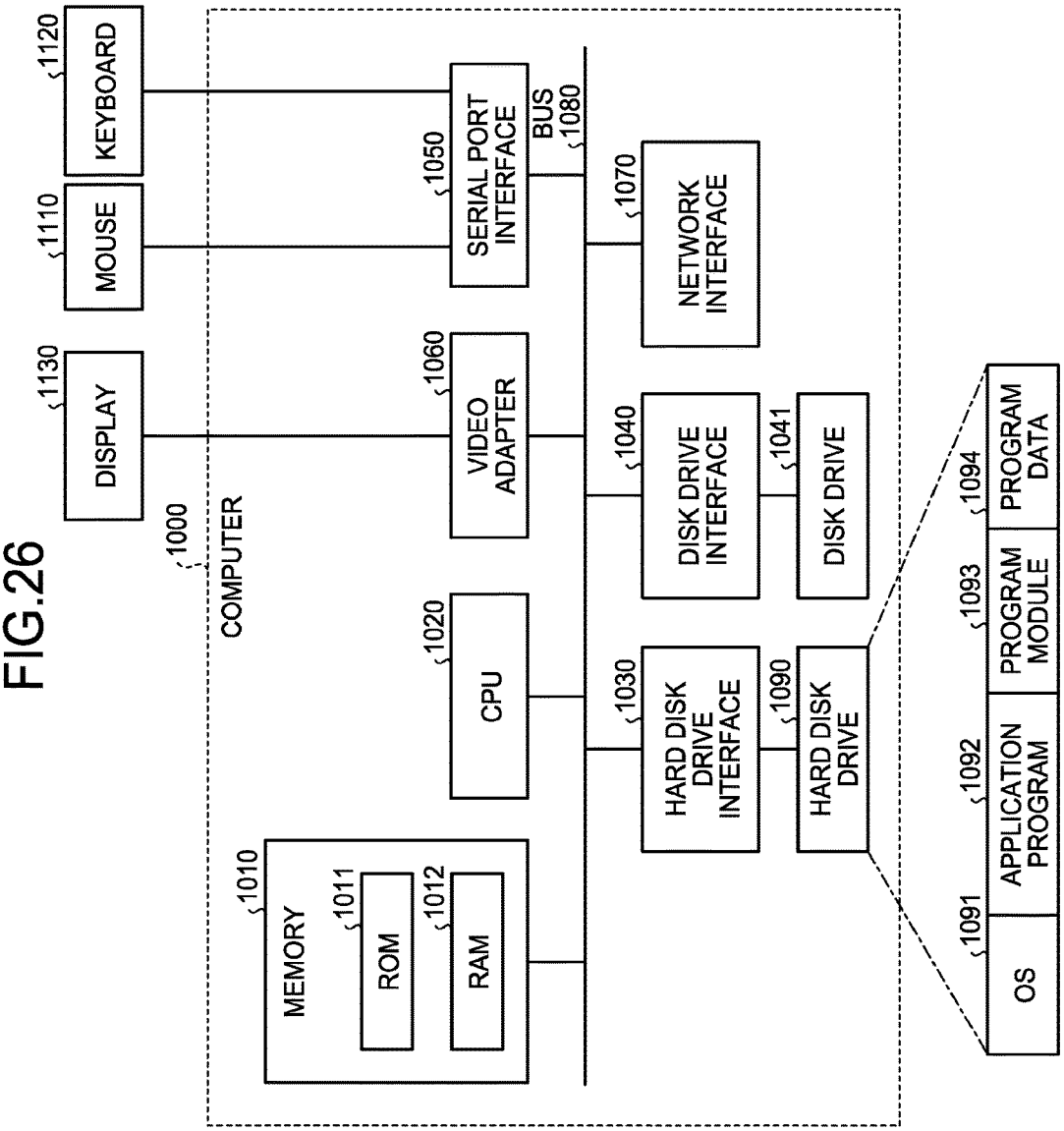
FIG. 26 is a diagram illustrating a computer that executes a communication control program.

FIG. 26 is a diagram illustrating the computer that executes the communication control program. As illustrated in FIG. 26, a computer 1000 has, for example, a memory 1010, a CPU 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a random access memory (RAM) 1012. The ROM 1011 stores therein a boot program, such as a basic input output system (BIOS), for example. The hard disk drive interface 1030 is connected to a hard disk drive 1090. The disk drive interface 1040 is connected to a disk drive 1041.

An attachable and detachable storage medium, such as a magnetic disk or an optical disk, for example, is inserted in the disk drive 1041. A mouse 1110 and a keyboard 1120, for example, are connected to the serial port interface 1050. A display 1130, for example, is connected to the video adapter 1060.

As illustrated in FIG. 26, the hard disk drive 1090 stores therein, for example, an OS 1091, an application program 1092, a program module 1093, and program data 1094. Each table described in the above embodiments is stored in, for example, the hard disk drive 1090 or the memory 1010.

Further, the communication control program is stored, as a program module in which commands executed by the computer 1000 are described, for example, in the hard disk drive 1090. Specifically, the program module, in which the processing executed by each device of the network system described in any of the above embodiments is described, is stored in the hard disk drive 1090.

Further, data used in information processing by the communication control program are stored as program data in, for example, the hard disk drive 1090. The CPU 1020 loads the program module 1093 or the program data 1094 stored in the hard disk drive 1090 as necessary into the RAM 1012 and executes the above described sequences.

The program module 1093 and the program data 1094 related to the communication control program are not necessarily stored in the hard disk drive 1090, and for example, may be stored in an attachable and detachable storage medium and read out by the CPU 1020 via the disk drive 1041 or the like. Or, the program module 1093 and program data 1094 related to the communication control program may be stored in another computer connected via a network, such as a local area network (LAN) or a wide area network (WAN), and read out by the CPU 1020 via the network interface 1070.

REFERENCE SIGNS LIST

10 COMMUNICATION APPARATUS
11 COLLECTION DEVICE
11*a* EXTRACTION UNIT
11*b*, 12*a*, 22*b*, 23*c*, 25*b* STORAGE UNIT
12, 25 COMMUNICATION CONTROL DEVICE
12*b*, 25*a* TUNNELING UNIT
12*c*, 25*c* COMMUNICATION CONTROL UNIT
14 OPENFLOW CONTROLLER
20 CONTROL APPARATUS
21 COLLECTION MANAGEMENT DEVICE
21*a* COLLECTION UNIT
21*b* EXTRACTION CONTROL UNIT
22 ANALYSIS DEVICE
22*a* ANALYSIS/LEARNING UNIT
23 CONTROL DETERMINATION DEVICE
23*a* DETERMINATION UNIT
23*b* CONTROL INSTRUCTION UNIT
24 ANALYZING DEVICE
24*a* DETAIL ANALYZING UNIT
26 ENCRYPTED COMMUNICATION INSPECTION DEVICE
27 ANOMALY INFORMATION ACCUMULATION UNIT
100 NETWORK SYSTEM

The invention claimed is:
1. A network system, comprising:
a communication apparatus located in a user's local network; and
a control apparatus, located outside the user's local network, that communicates with the communication apparatus via an external network, wherein
the communication apparatus comprises:
processing circuitry configured to implement
a communication control unit that controls communication going through the communication apparatus; and
a collection unit that forms partial information that is a part, but less than all, of information related to the communication based on a predetermined collection rule, and transmits the partial information to the control apparatus;
the control apparatus comprises:
processing circuitry configured to implement
an analysis unit that performs analysis by using the partial information received from the communication apparatus and determines whether or not the communication is abnormal;
a control determination unit that controls a communication route for the communication control unit such that the communication is transmitted from the communication apparatus to the control apparatus when the communication is determined to be abnormal by the analysis unit; and
an analyzing unit that determines whether or not the communication transmitted by the control of the communication route is malicious communication, and
the control determination unit further controls, when the communication is determined to be malicious communication by the analyzing unit, the communication control unit to restrict the malicious communication,
wherein
the analysis unit generates model information based on partial information received from a plurality of communication apparatuses and stores the model information in a memory, and
the analysis unit applies the model information to the analysis.

2. The network system according to claim 1, wherein the plurality of communication apparatuses include the communication apparatus.

3. The network system according to claim 1, wherein the analysis unit integrates model information generated based on the partial information received from each of the plurality of communication apparatuses to generate the model information.

4. The network system according to claim 3, wherein the analysis unit integrates the model information by using clustered model information that is results of analysis of a respective user's local network.

5. The network system according to claim 4, wherein a degree of similarity of the model information is calculated by using a Jaccard coefficient, a Dice coefficient, or a Simpson coefficient or any combination thereof.

6. The network system according to claim 3, wherein the analysis unit integrates the model information between the plurality of communication apparatuses having similar communication behaviors.

7. The network system according to claim 1, wherein the analysis unit stores the model information in association with each communication apparatus in the memory.

8. The network system according to claim 1, wherein the analysis unit stores a plurality of pieces of model information, and determines whether model itself is abnormal by comparing the plurality of pieces of model information with each other.

9. A control apparatus comprising:
a memory; and
processing circuitry coupled to the memory and configured to implement
an analysis unit that performs analysis by using information received from a communication apparatus and determines whether or not communication is abnormal;
a control determination unit that controls a communication route of the communication apparatus such that the communication is transmitted from the communication apparatus to the control apparatus when the communication is determined to be abnormal by the analysis unit; and
an analyzing unit that determines whether or not the communication transmitted by the control of the communication route is malicious communication, and
the control determination unit further controls, when the communication is determined to be malicious communication by the analyzing unit, the communication apparatus to restrict the malicious communication,
wherein
the analysis unit generates model information based on partial information received from a plurality of communication apparatuses and stores the model information in the memory,
the analysis unit applies the model information to the analysis, and
the communication apparatus is located in a user's local network, and the control apparatus, located outside the user's local network, communicates with the communication apparatus via an external network.

10. The control apparatus according to claim 9, wherein the plurality of communication apparatuses include the communication apparatus.

11. The control apparatus according to claim 9, wherein the analysis unit integrates model information generated based on the information received from each of the plurality of communication apparatuses to generate the model information.

12. The control apparatus according to claim 11, wherein the analysis unit integrates the model information by using clustered model information that is results of analysis of a respective user's local network.

13. The control apparatus according to claim 12, wherein a degree of similarity of the model information is calculated by using a Jaccard coefficient, a Dice coefficient, or a Simpson coefficient or any combination thereof.

14. The control apparatus according to claim 11, wherein the analysis unit integrates the model information between the plurality of communication apparatuses having similar communication behaviors.

15. The control apparatus according to claim 9, wherein the analysis unit stores the model information in association with each communication apparatus in the memory.

16. The control apparatus according to claim 9, wherein the analysis unit stores a plurality of pieces of model information, and determines whether model itself is abnormal by comparing the plurality of pieces of model information with each other.

17. A control method comprising:
performing analysis by using information received from a communication apparatus and determining whether or not communication is abnormal, by processing circuitry;
controlling a communication route of the communication apparatus such that the communication is transmitted from the communication apparatus to a control apparatus when the communication is determined to be abnormal at the performing; and
determining whether or not the communication transmitted by the control of the communication route is malicious communication, and
the controlling further includes controlling, when the communication is determined to be malicious communication at the determining, the communication apparatus to restrict the malicious communication,
wherein
the performing analysis includes generating model information based on partial information received from a plurality of communication apparatuses and storing the model information in a memory,
the performing analysis includes applying the model information to the analysis, and
the communication apparatus is located in a user's local network, and the control apparatus, located outside the user's local network, communicates with the communication apparatus via an external network.

18. The control method according to claim 17, wherein the plurality of communication apparatuses include the communication apparatus.

19. The control method according to claim 17, wherein the performing includes integrating model information generated based on the information received from each of the plurality of communication apparatuses to generate the model information.

20. The control method according to claim 19, wherein the performing includes integrating the model information by using clustered model information that is results of analysis of a respective user's local network.

* * * * *